United States Patent
Wang et al.

(10) Patent No.: US 11,232,543 B2
(45) Date of Patent: Jan. 25, 2022

(54) SYSTEM AND METHOD FOR IMAGE CORRECTION

(71) Applicant: SHANGHAI UNITED IMAGING HEALTHCARE CO., LTD., Shanghai (CN)

(72) Inventors: Yi Wang, Shanghai (CN); Wenjing Cao, Shanghai (CN)

(73) Assignee: SHANGHAI UNITED IMAGING HEALTHCARE CO., LTD., Shanghai (CN)

(\*) Notice: Subject to any disclaimer, the term of this patent is extended or adjusted under 35 U.S.C. 154(b) by 89 days.

(21) Appl. No.: 16/729,515

(22) Filed: Dec. 30, 2019

(65) Prior Publication Data

US 2020/0143521 A1    May 7, 2020

Related U.S. Application Data

(62) Division of application No. 15/323,062, filed as application No. PCT/CN2016/102005 on Oct. 13, 2016, now Pat. No. 10,521,886.

(30) Foreign Application Priority Data

Oct. 14, 2015 (CN) .......................... 201510660920.0
Jan. 21, 2016 (CN) .......................... 201610038856.7

(51) Int. Cl.
*G06T 5/00* (2006.01)
*G06T 7/11* (2017.01)
(Continued)

(52) U.S. Cl.
CPC ................ *G06T 5/002* (2013.01); *G06T 5/50* (2013.01); *G06T 7/11* (2017.01); *G06T 11/008* (2013.01);
(Continued)

(58) Field of Classification Search
None
See application file for complete search history.

(56) References Cited

U.S. PATENT DOCUMENTS 7,372,936 B2    5/2008  Nukui
7,583,857 B2 *  9/2009  Xu ...................... G06K 9/3216
                                                358/450

(Continued)

FOREIGN PATENT DOCUMENTS

CN    102426696 A    4/2012
CN    103020928 A    4/2013
(Continued)

OTHER PUBLICATIONS

International Search Report in PCT/CN2016/102005 dated Jan. 3, 2017, 4 pages.
(Continued)

*Primary Examiner* — Jiangeng Sun
(74) *Attorney, Agent, or Firm* — Metis IP LLC

(57) ABSTRACT

A system and method for image correction is provided. The method includes: receiving an original image; pre-correcting the original image; generating correction data based on the original image and the pre-corrected image; weighting the original image and the pre-corrected image based on the correction data; and generating a corrected image based on the weighting.

17 Claims, 19 Drawing Sheets

(51) Int. Cl.
*G06T 5/50* (2006.01)
*G06T 11/00* (2006.01)

(52) U.S. Cl.
CPC ............... *G06T 2207/10081* (2013.01); *G06T 2207/20182* (2013.01); *G06T 2207/20216* (2013.01); *G06T 2207/20221* (2013.01); *G06T 2211/424* (2013.01)

(56) References Cited

U.S. PATENT DOCUMENTS

| | | | | |
|---|---|---|---|---|
| 8,619,082 | B1* | 12/2013 | Ciurea | G02B 27/0075 345/427 |
| 8,891,885 | B2 | 11/2014 | Kachelriess et al. | |
| 2009/0110309 | A1* | 4/2009 | Sakai | H04N 5/783 382/233 |
| 2012/0063660 | A1 | 3/2012 | Imamura et al. | |
| 2013/0039556 | A1 | 2/2013 | Kachelriess et al. | |
| 2014/0286558 | A1 | 9/2014 | Koehler et al. | |
| 2015/0117740 | A1* | 4/2015 | Dong | G06T 5/005 382/131 |
| 2015/0146955 | A1* | 5/2015 | Dong | G06T 11/008 382/131 |
| 2015/0190106 | A1 | 7/2015 | Yamakawa et al. | |
| 2016/0110893 | A1* | 4/2016 | Pang | G06T 11/005 382/131 |
| 2016/0163071 | A1* | 6/2016 | Han | G06T 11/008 382/131 |
| 2016/0364856 | A1 | 12/2016 | Zheng et al. | |
| 2017/0026597 | A1* | 1/2017 | Cao | H04N 9/04515 |
| 2018/0205909 | A1* | 7/2018 | Staranowicz | H04N 11/20 |

FOREIGN PATENT DOCUMENTS

| | | | |
|---|---|---|---|
| CN | 103106675 | A | 5/2013 |
| CN | 103186883 | A | 7/2013 |
| CN | 103190928 | A | 7/2013 |
| CN | 103310432 | A | 9/2013 |
| CN | 103679642 | A | 3/2014 |
| CN | 104323777 | A | 2/2015 |
| CN | 105225208 | A | 1/2016 |
| CN | 105528800 | A | 4/2016 |

OTHER PUBLICATIONS

Written Opinion of the International Searching Authority in PCT/CN2016/102005 dated Jan. 3, 2017, 6 pages.
First Office Action in Chinese Application No. 201510660920.0 dated May 10, 2017, 9 pages.
First Office Action in Chinese Application No. 201610038856.7 dated Nov. 28, 2016, 9 pages.
Liu, Yaxiong et al., Correction of CT Motion Artifacts: Journal of Xi'an Jiaotong University, 38(5): 479-82 (2004).
Wu, Zhi-Hong et al., Beam Hardening Artifact Correction in CT Based on Re-projection: Atomic Energy Science and Tech, 49(5): 935-38 (2015).
Wang et al., Iterative Deblurring for CT Metal Artifact Reduction, IEEE Transactions on Medical Imaging, 15(5):657-664 (1996).
The Extended European Search Report In European Application No. 16854945.9 dated Oct. 19, 2018, 8 pages.
Catherine Lemmens et al., Suppression of Metal Artifacts in CT Using a Reconstruction Procedure that Combines MAP and Projection Completion, IEEE Transactions on Medical Imaging, 28(2) : 250-260 (2009).
Jun Wang et al., Metal Artifact reduction in CT Using Fusion Based Prior Image, Medical Physics, American Association of Physicists in Medicine, 40(8), 2013.
Meyer et al., Frequency Split Metal Artifact Reduction(FSMAR) in computed tomography, Medical Physics, 39: 1904-1916, 2012.

* cited by examiner

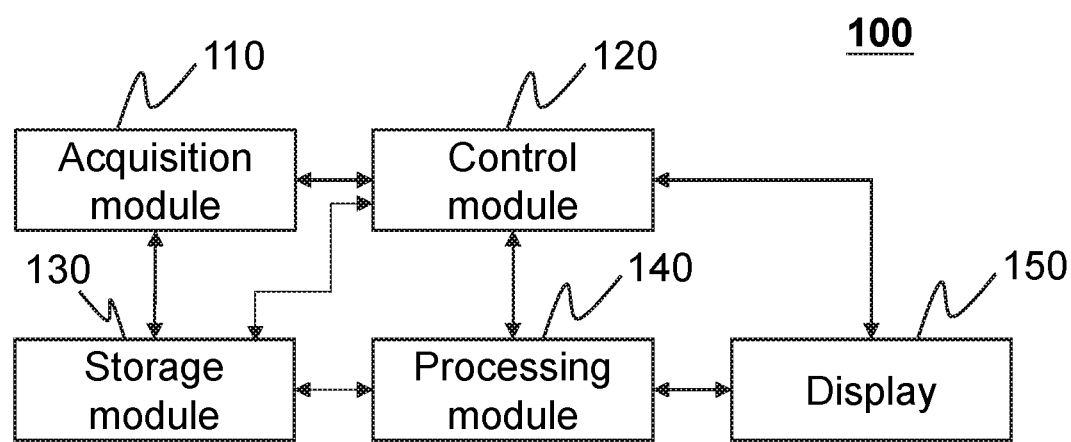
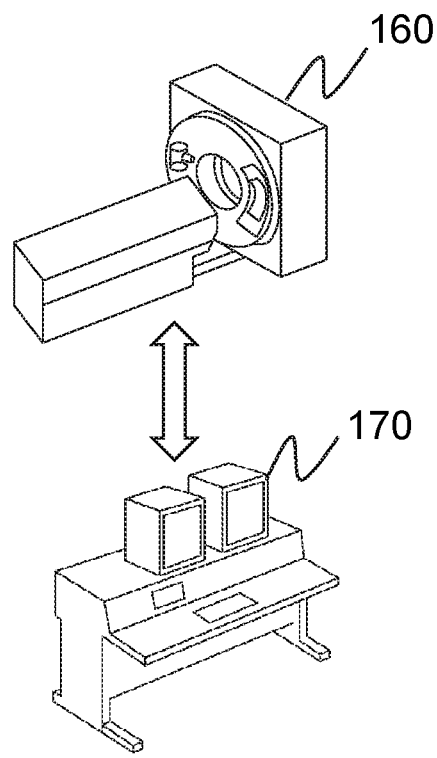
FIG. 1

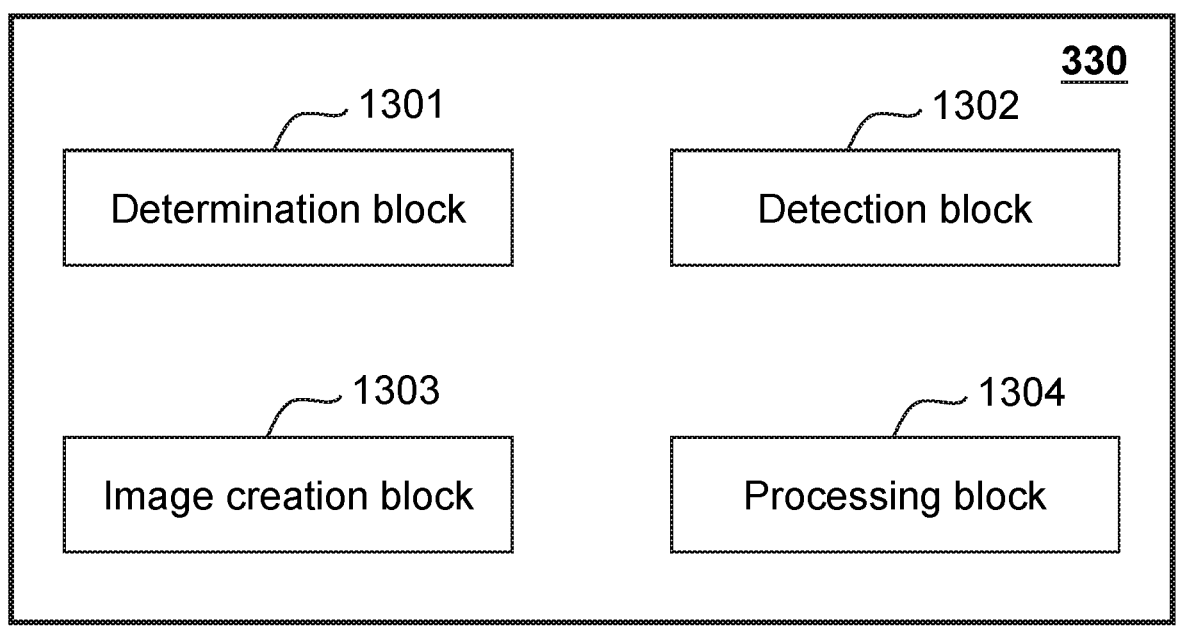
FIG. 13-A

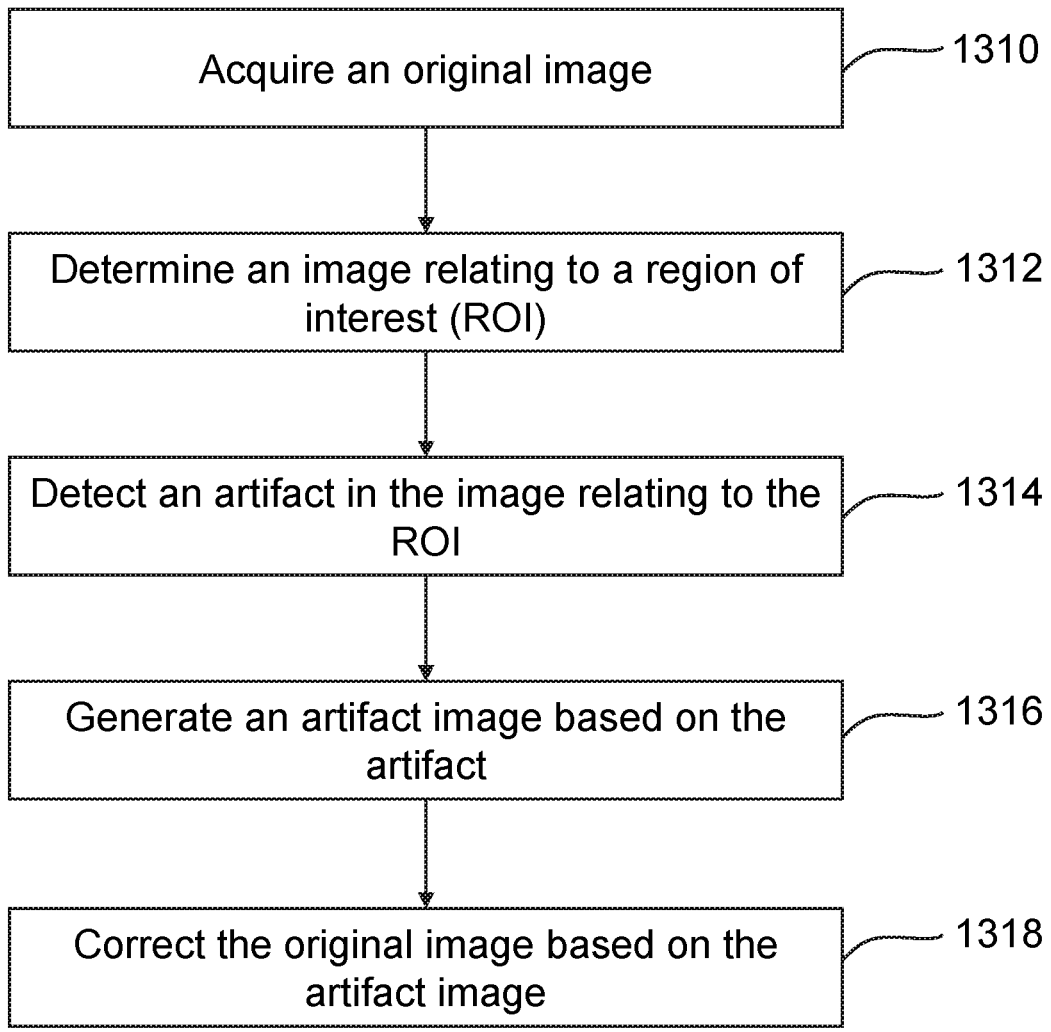
FIG. 13-B

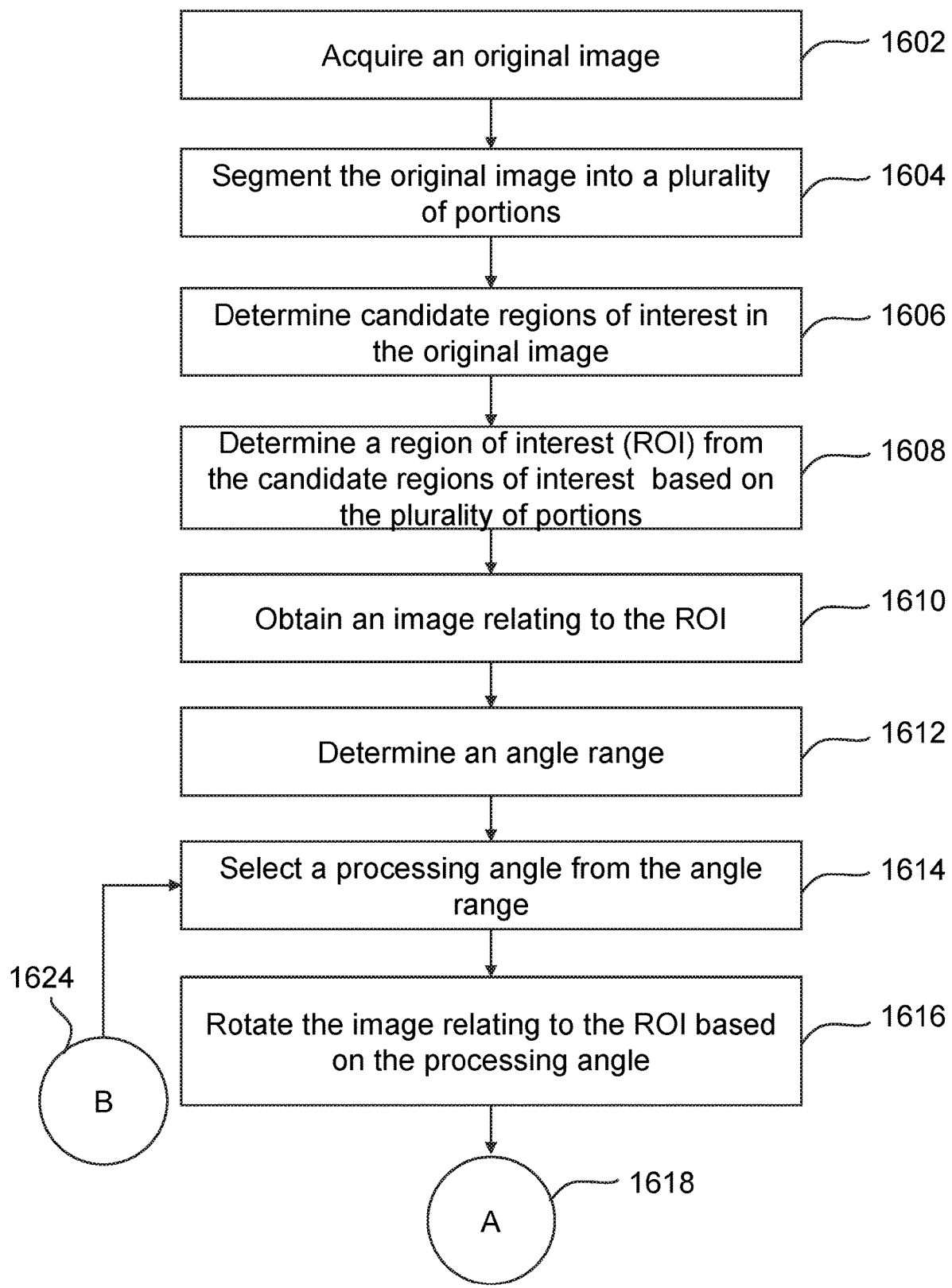
FIG. 16-A

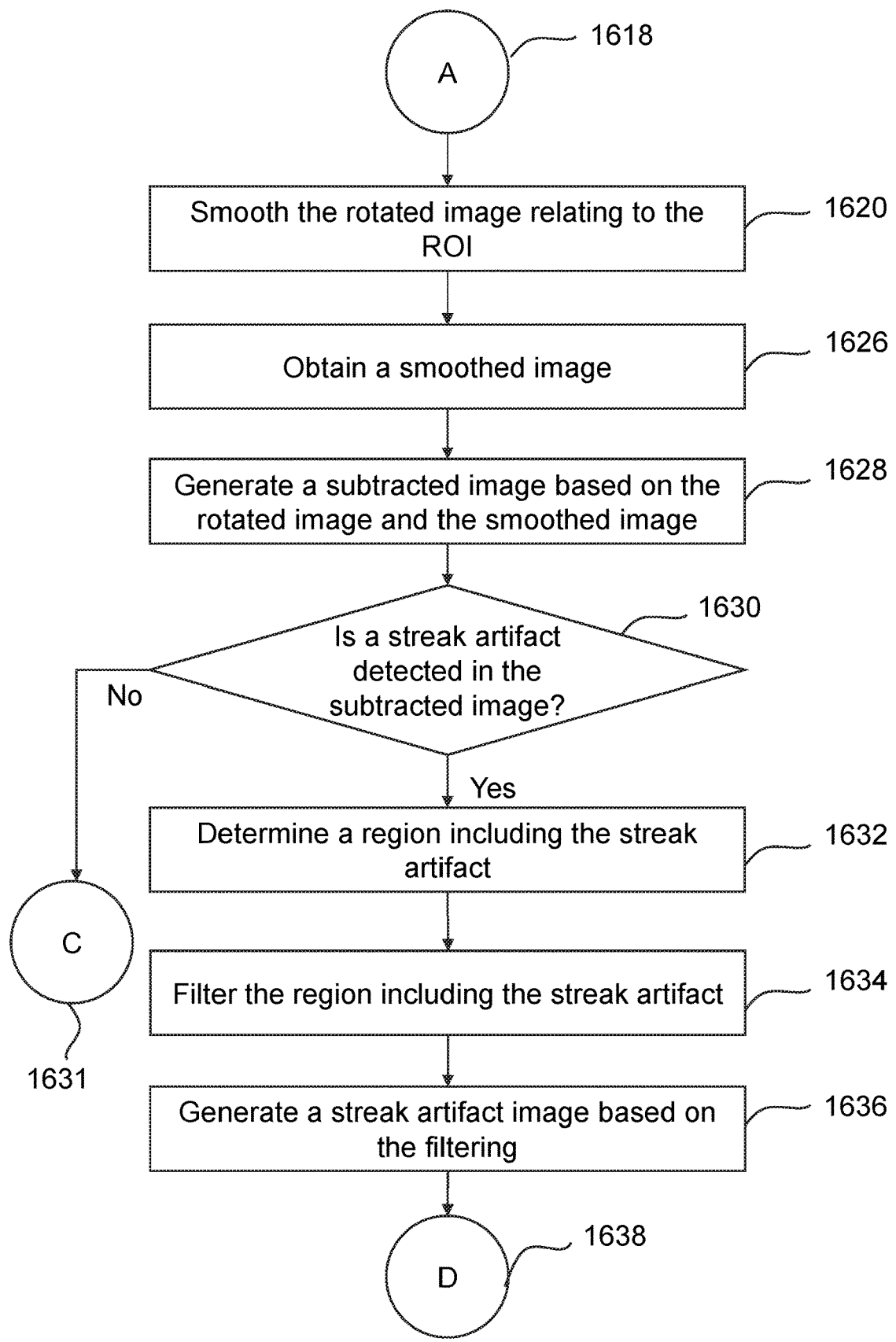
FIG. 16-B

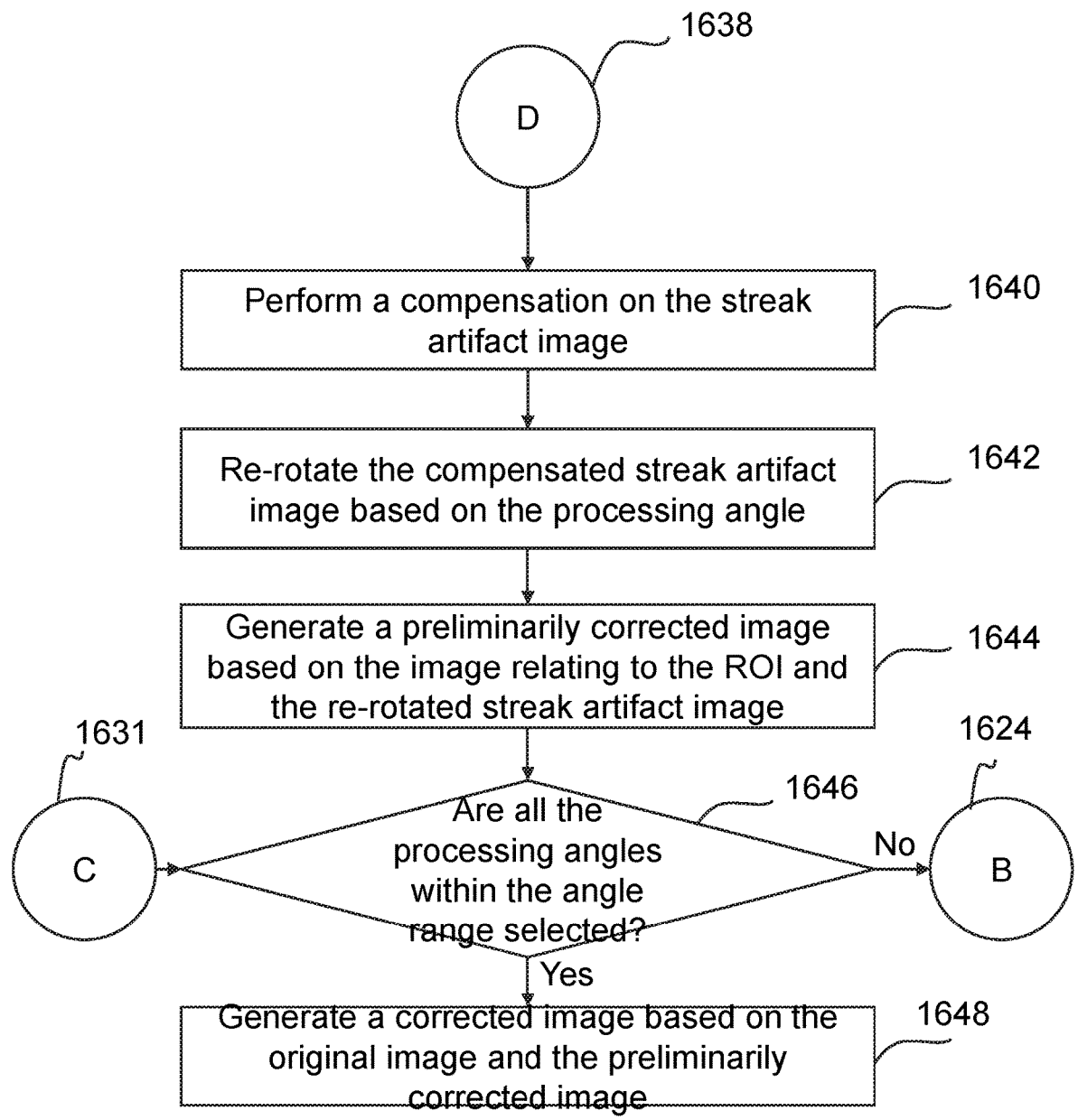
FIG. 16-C

SYSTEM AND METHOD FOR IMAGE CORRECTION

CROSS-REFERENCE TO RELATED APPLICATIONS

This application is a divisional application of U.S. application Ser. No. 15/323,062 filed on Dec. 29, 2016, which is a U.S. national stage under 35 U.S.C. § 371 of International Application No. PCT/CN2016/102005, filed on Oct. 13, 2016, designating the United States of America, which claims priority of Chinese Patent Application No. 201510660920.0 filed Oct. 14, 2015 and Chinese Patent Application No. 201610038856.7 filed Jan. 21, 2016, the contents of each of which are hereby incorporated by reference.

TECHNICAL FIELD

The present disclosure generally relates to imaging, and more particularly to a system and method for image correction in computed tomography.

BACKGROUND

Computed tomography (CT) is a technology that makes use of computer-processed combinations of X-ray images taken from different angles to produce cross-sectional images. The CT technology has been widely used in medical diagnosis. During a process of a CT scanning, artifacts including metal artifacts or streak artifacts may occur. The artifacts may reduce the image quality and influence the diagnosis results. There is a need for a system and method to remove the artifacts from the images and improve the image quality.

SUMMARY

In a first aspect of the present disclosure, a method for image correction is provided. The method may include one or more of the following operations. An original image may be received. The original image may be pre-corrected.

Correction data may be generated based on the original image and the pre-corrected image. The original image and the pre-corrected image may be weighted based on the correction data. A corrected image may be generated based on the weighting.

In some embodiments, the correction data may include projection data of the original image, projection data of the pre-corrected image, or an error image of the original image.

In some embodiments, a metal image including metal information may be determined based on the original image. Projection data of the artifact image may be generated. An interpolation may be performed based on the projection data of the artifact image and the projection data of the original image.

In some embodiments, the projection data of the original image and the projection data of the pre-corrected image may be weighted.

In some embodiments, the weighting the original image and the pre-corrected image may be performed based on a regularity degree of the artifact.

In some embodiments, when the regularity degree is below a first threshold, the weighting may be performed according to a first weighting intensity; when the regularity degree exceeds the first threshold but below a second threshold, the weighting may be performed according to a second weighting intensity; and when the regularity degree exceeds the second threshold, the weighting may be performed according to a third weighting intensity.

In some embodiments, the error image may be generated based on the pre-corrected image and the original image.

In some embodiments, a plurality of weighting coefficients may be determined. A weighting coefficient may correspond to a pixel in the error image. The original image and the error image may be weighted based on the plurality of weighting coefficients.

In some embodiments, the information entropy of a third pixel in the pre-corrected image may be determined. The third pixel may correspond to a first pixel in the original image and a second pixel in the error image. The weighting coefficient of the second pixel in the error image may be determined based on the information entropy of the third pixel in the pre-corrected image.

In some embodiments, the weighting coefficient of the second pixel in the error image may be determined when the information entropy of the third pixel in the pre-corrected image is minimum.

In some embodiments, a first neighborhood matrix of the first pixel in the original image and a second neighborhood matrix of the second pixel in the error image may be determined. A third neighborhood matrix of the third pixel in the pre-corrected image may be determined based on the first neighborhood matrix and the second neighborhood matrix. The information entropy of the third pixel in the pre-corrected image may be calculated based on the third neighborhood matrix.

In some embodiments, the size of the first neighborhood matrix or the size of the second neighborhood matrix may be determined based on a feature of the error image.

In some embodiments, the size of the first neighborhood matrix or the size of the second neighborhood matrix may be between 9 and 31 pixels.

In some embodiments, the original image, the pre-corrected image, the error image, or the corrected image may be compressed according to a preset field of view.

In some embodiments, a compensation may be performed on the corrected image.

In some embodiments, a high frequency part of the original image may be segmented. A low frequency part of the corrected image may be segmented. The high frequency part of the original image and the low frequency of the corrected image may be fused.

In a second aspect of the present disclosure, a method for image correction is provided. The method may include one or more of the following operations. An original image may be received. An image relating to a region of interest may be obtained. An artifact in the image relating to the region of interest may be detected.

An artifact image may be generated based on the artifact. The original image may be corrected based on the artifact image.

In some embodiments, the original image may be segmented into a plurality of portions, the plurality of portions include an air portion and a tissue portion. Candidate regions of interest of the original image may be determined. The region of interest may be determined from the candidate regions of interest based on the plurality of portions, wherein in the region of interest, a percentage of the tissue portion is below a third threshold.

In some embodiments, an angle range may be determined. A processing angle may be selected from the angle range. The image relating to the region of interest may be rotated by the processing angle. The rotated image may be smoothed to obtain a smoothed image. A subtracted image may be generated based on the original image and the smoothed image. The artifact may be detected in the subtracted image.

In some embodiments, whether the detected artifact is a potential tissue may be determined to obtain a determination result. A compensation may be performed based on the determination result to the detected artifact.

In a third aspect of the present disclosure, a system for image correction is provided. The system may include a pre-correction block, a generation block, and a weighting block. The pre-correction block may be configured to receive an original image; and pre-correct the original image. The generation block may be configured to generate correction data based on the original image and the pre-corrected image. The weighting block may be configured to weight the original image and the pre-corrected image based on the correction data; and generate a corrected image based on the weighting.

In a fourth aspect of the present disclosure, a system for image correction is provided. The system may include a determination block, a detection block, an image creation block, and a processing block. The determination block may be configured to receive an original image; and obtain an image relating to a region of interest. The detection block may be configured to detect an artifact in the image relating to the region of interest. The image creation block may be configured to generate an artifact image based on the artifact. The processing block may be configured to correct the original image based on the artifact image.

In a fifth aspect of the present disclosure, a device including memory storing instructions and at least one processor that executes the instructions to perform operations. When the at least one processor executing the instructions, the at least one processor may perform one or more of the following operations. An original image may be received. The original image may be pre-corrected. Correction data may be generated based on the original image and the pre-corrected image. The original image and the pre-corrected image may be weighted based on the correction data. A corrected image may be generated based on the weighting.

In a sixth aspect of the present disclosure, a device including memory storing instructions and at least one processor that executes the instructions to perform operations. When the at least one processor executing the instructions, the at least one processor may perform one or more of the following operations. An original image may be received. An image relating to a region of interest may be obtained. An artifact in the image relating to the region of interest may be detected. An artifact image may be generated based on the artifact. The original image may be corrected based on the artifact image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a block diagram depicting an imaging system according to some embodiments of the present disclosure;

FIG. 13-A is a block diagram illustrating an architecture of a correction unit according to some embodiments of the present disclosure;

FIG. 13-B is a flowchart illustrating a process for correcting an image according to some embodiments of the present disclosure;

FIG. 16-A through FIG. 16-C illustrate an exemplary process for generating a corrected image according to some embodiments of the present disclosure.

DETAILED DESCRIPTION

Figure 2:
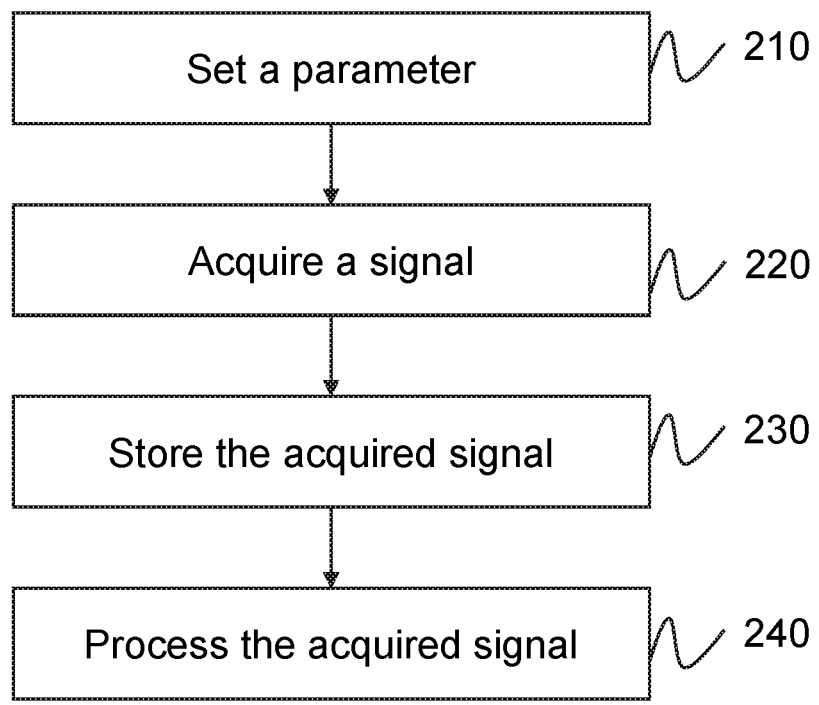
FIG. 2 is a flowchart of signal processing according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

FIG. 1 is a block diagram of an imaging system 100 according to some embodiments of the present disclosure. It should be noted that the imaging system 100 described below is merely provided for illustration purposes, and not intended to limit the scope of the present disclosure. The radiation used herein may include a particle ray, a photon ray, or the like, or any combination thereof. The particle ray may include neutron, proton, electron, μ-meson, heavy ion, or the like, or any combination thereof. The photon beam may include X-ray, γ-ray, ultraviolet, laser, or the like, or any combination thereof. The imaging system may find its applications in different fields such as, for example, medicine or industry. Merely by way of example, the imaging system may be a positron emission tomography (PET) system, a single photon emission computed tomography (SPECT) system, a computed tomography (CT) system, a digital radiography (DR) system, a multi-modality system, or the like, or any combination thereof. Exemplary multi-modality system may include a computed tomography-positron emission tomography (CT-PET) system, a positron emission tomography-magnetic resonance imaging (PET-MRI) system, a computed tomography-positron emission tomography-magnetic resonance imaging (CT-PET-MRI) system, etc. As another example, the system may be used in internal inspection of components including, e.g., flaw detection, security scanning, failure analysis, metrology, assembly analysis, void analysis, wall thickness analysis, or the like, or any combination thereof.

As illustrated in FIG. 1, the imaging system 100 may include an acquisition module 110, a control module 120, a storage module 130, a processing module 140, and a display 150.

The acquisition module 110 may detect radiation rays, or receive information regarding detected radiation rays in the imaging system. The acquisition module 110 may include or communicate with a scanner (e.g., a PET scanner, a CT scanner, or the like, or a combination thereof). Merely by way of example, the radiation rays may take the form of line of response (LOR) in a PET system. Detection of the LORs may be performed by the acquisition module 110 by way of counting values of coincidence from annihilation of positrons. As another example, the radiation rays may be X-ray beams passing through an object (e.g., a patient) in a CT system. The intensity of an X-ray beam passing through the object that lies between the X-ray source and a detector (not shown) may be attenuated, and further evaluated by the acquisition module 110. In some embodiments, the ROM may store programs for imaging of various types of nuclear medicine diagnosis. Exemplary types of nuclear medicine diagnosis may include PET, SPECT, CT, MRI, or the like, or a combination thereof. It should also be noted here that the "line of response" or "LOR" used here may be representative of a radiation ray, and not intended to limit the scope of the present disclosure. The radiation ray used herein may include a particle ray, a photon ray, or the like, or any combination thereof. The particle ray may include neutron, proton, electron, μ-meson, heavy ion, or the like, or any combination thereof. For example, the radiation ray may represent the intensity of an X-ray beam passing through the subject in the case of a CT system. As another example, the radiation ray may represent the probability of a positron generated in the case of a PET system.

The acquisition module 110 may select data to be further processed from the original data. The acquisition module 110 may measure the number of radiation rays incident on the detector and determine, for example, the line of response (LOR) in the case of PET, the projected X-rays that pass through a subject in the case of CT, etc. In some embodiments, the acquisition module 110 may be a coincidence counting circuit in a PET case. For instance, from a subject (e.g., a patient, etc.) who has taken a radioactive drug (e.g., 11C, 13N, 15O, or the like), two gamma rays may be generated by the annihilation of a positron. The gamma rays may be detected or registered by two opposing detector units of the PET system. For example, a coincidence counting circuit may check the incidence of the gamma rays, and determine the registered event to be proper data when the gamma rays impinge on the detector (not shown) at the opposite sides of the patient at or around the same time. The coincidence counting circuit may be part of the acquisition module 110. In some embodiments, the acquisition module 110 may be designed to surround a subject to form a table type scanner 160 (e.g., a CT scanner).

The control module 120 may control the acquisition module 110, the storage module 130, the processing module 140, and the display 150. The control module 120 may receive information from and send information to the acquisition module 110, the storage module 130, the processing module 140, and/or the display 150. In some embodiments, the control module 120 may control the operation of the acquisition module 110. Merely for example, the control module 120 may control whether to acquire a signal, or the time when the next signal acquisition may occur. As another example, the control module 120 may control which section of radiation rays may be processed during an iteration of the reconstruction. The control module 120 may control the processing module 140, for example, to select different algorithms to process the raw data of an image, to determine the iteration times of the iteration projection process, and/or the location of the radiation rays. In some embodiments, the control module 120 may receive a real-time or a predetermined command from the display 150 provided by a user including, e.g., an imaging technician, or a doctor, and adjust the acquisition module 110, and/or the processing module 140 to take images of a subject of interest according to the received command. In some embodiments, the control module 120 may communicate with the other modules for exchanging information relating to the operation of the scanner or other parts of the imaging system 100.

The storage module 130 may store the acquired signals, the control parameters, the processed signals, or the like. In some embodiments, the storage module 130 may include a random access memory (RAM), a read only memory (ROM), for example, a hard disk, a floppy disk, a cloud storage, a magnetic tape, a compact disk, a removable storage, or the like, or a combination thereof. The removable storage may read from and/or write data to a removable storage unit in a certain manner. The storage device may also be other similar means for loading computer programs or other instructions into the computer or processor.

The processing module 140 may process different kinds of information received from different units. In some embodiments, the processing module 140 may process the signals acquired by the acquisition module 110, or stored in the storage module 130. In some embodiments, the processing module 140 may generate images, reports including one or more images and/or other related information, or the like, or a combination thereof. In some embodiments, the processing module 140 may process the information displayed in the display 150.

The display 150 may receive input and/or display output information. The display may include a liquid crystal display (LCD), a light emitting diode (LED)-based display, or any other flat panel display, or may use a cathode ray tube (CRT), a touch screen, or the like. A touch screen may include, e.g., a resistance touch screen, a capacity touch screen, a plasma touch screen, a vector pressure sensing touch screen, an infrared touch screen, or the like, or a combination thereof.

Further, while not shown, the imaging system 100 may be connected to a network (e.g., a telecommunications network, a local area network (LAN), a wireless network, a wide area network (WAN) such as the Internet, a peer-to-peer network, a cable network, etc.) for communication purposes.

For further understanding the present disclosure, several examples are given below, but the examples do not limit the scope of the present disclosure. For example, in some embodiments, the processing module 140 may process signals received from the acquisition module 110 and generate one or more images based on these signals and deliver the images to the display 150. In some embodiments, the processing module 140 may process data input by a user or an operator via the display 150 and transform the data into specific commands, and supply the commands to the control module 120. The display 150 may receive input and/or display output information. The input and/or output information may include programs, software, algorithms, data, text, number, images, voice, or the like, or any combination thereof. For example, a user or an operator may input some initial parameters or conditions to initiate a scan. As another example, some information may be imported from an external resource, such as a floppy disk, a hard disk, a wireless terminal, or the like, or any combination thereof. In some embodiments, the control module 120, the storage module 130, the processing module 140, and/or the display 150 may be integrated into a console 170. Via the console 170, a user may set parameters for scanning, control the imaging procedure, view the images produced through the console 170, or the like, or a combination thereof.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios. Merely by way of example, some other components may be added into the imaging system 100, such as a patient positioning module, a gradient amplifier module, and other devices or modules. As another example, the storage module 130 is unnecessary and the modules or modules in the imaging system 100 may include an integrated storage unit respectively. Note that the imaging system may be a traditional or a single-modality medical system, or a multi-modality system including, e.g., a positron emission tomography-magnetic resonance imaging (PET-MRI) system, a single photon emission computed tomography-magnetic resonance imaging (SPECT-MRI) system, a remote medical MRI system, and others, etc. However, those variations and modifications do not depart from the scope of the present disclosure.

FIG. 2 is a flowchart of signal processing according to some embodiments of the present disclosure. In step 210, a parameter may be set. The parameter may be set by the control module 120. In some embodiments, the parameter may include a parameter relating to an acquisition process, a parameter relating to a storing process, a processing parameter, a parameter relating to a displaying process, or the like, or a combination thereof. Merely by way of example, the parameter may include current, voltage, a scanning protocol designed for one or more tissues to be imaged, diseases, and/or clinical scenarios, sampling speed, sampling frequency, storage speed, storage volume management, image reconstruction method, or the like, or a combination thereof. In some embodiments, the parameter may be set via the console 170.

In step 220, a signal may be acquired. The signal may be a PET signal, a CT signal, a SPECT signal, an MRI signal, or the like, or a combination thereof. In some embodiments, the signal acquisition may be performed by the acquisition module 110. In some embodiments, the signal may be acquired from the storage module 130. In some embodiments, the signal may be retrieved from an external device or via a user input. In step 230, the acquired signal may be stored. The acquired signal may be stored in the storage module 130 or any storage disclosed anywhere in the present disclosure. In some embodiments, step 220 and step 230 may be integrated into a single step in which the signal may be acquired and stored simultaneously or successively.

In step 240, the signal may be processed. The processing may be performed by the processing module 140. During the processing, one or more processing parameters may be set. In some embodiments, the signal may be processed to reconstruct an image (e.g., a PET image, a CT image, a SPECT image, an MRI image, or the like). In some embodiments, the reconstructed image may be further corrected to remove or reduce artifact(s). In some embodiments, the reconstructed image may be further processed and a report including the reconstructed image may be generated. In some embodiments, the reconstructed image and/or the generated report may be transmitted to a related device (e.g., a terminal, a database, or the like). In some embodiments, the reconstructed image and/or the generated report may be transmitted to a related device to be further processed (e.g., to be printed, to be displayed, or the like).

It should be noted that the above description is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, step 230 may be unnecessary, and the acquired signal may be processed directly in step 240 without storing. As another example, the parameter may be set during any step of the entire process.

Figure 3:
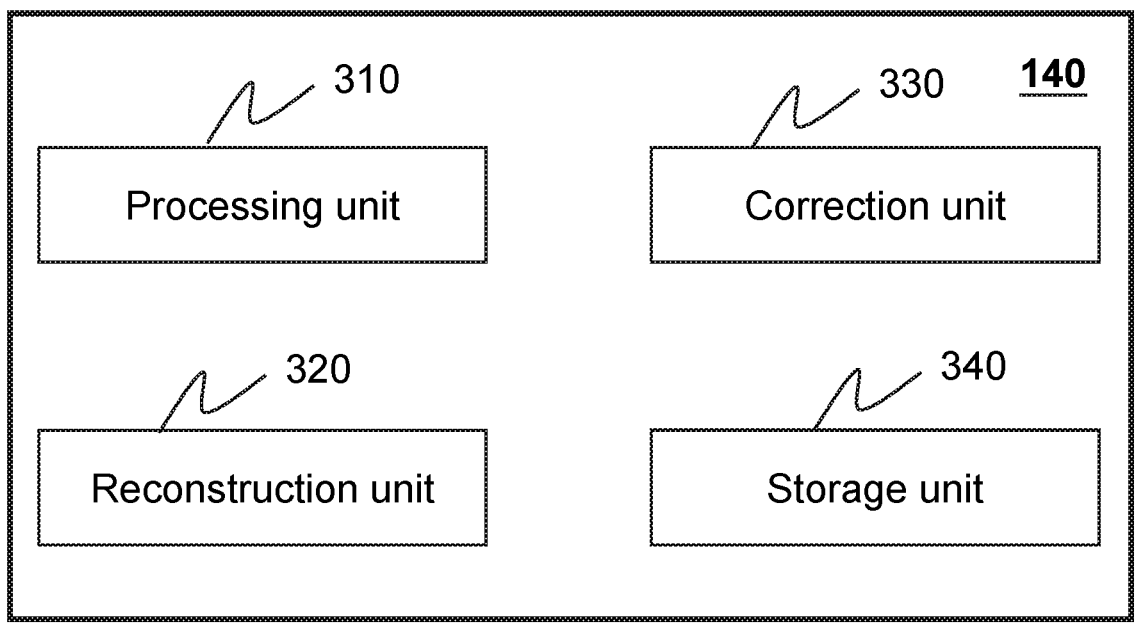
FIG. 3 is a block diagram illustrating an architecture of a processing module according to some embodiments of the present disclosure.

FIG. 3 is a block diagram illustrating an architecture of a processing module according to some embodiments of the present disclosure. In some embodiments, the processing module 140 may include a processing unit 310, a reconstruction unit 320, a correction unit 330, and a storage unit 340. In some embodiments, at least two of the units may be connected with each other via a wired connection (e.g., a metal cable, an optical cable, a hybrid cable, or the like, or any combination thereof) or a wireless connection (e.g., a Local Area Network (LAN), a Wide Area Network (WAN), a Bluetooth, a ZigBee, a Near Field Communication (NFC), or the like, or any combination thereof). In some embodiments, the units may be connected with each other through a medium. The medium may include a visible medium or an invisible medium (e.g., radio, optical, sonic, electromagnetic induction, etc.).

The processing unit 310 may process different kinds of information received from the control module 120, the storage module 130, and/or the display module 150. The information may include a signal (e.g., a CT signal), information regarding a subject, a control parameter (e.g., acquisition frequency, acquisition speed, or the like), a display parameter (e.g., brightness, resolution ratio, scale, or the like), or the like, or a combination thereof. Merely by way of example, the processing unit 310 may process the signal, e.g., remove or reduce noises, filter the signal, convert the signal from an analog signal to a digital signal, or the like, or a combination thereof.

The reconstruction unit 320 may generate an image relating to an object (e.g., a portion of a subject). The reconstruction unit 320 may employ different kinds of image reconstruction techniques for the image reconstruction procedure. Exemplary image reconstruction techniques may include Fourier slice theorem, filtered back projection algorithm, fan-beam reconstruction, iterative reconstruction, or the like, or a combination thereof. In some embodiments, the reconstruction unit 320 may include one or more sub-units (not shown). The sub-units may reconstruct images by employing different reconstruction methods. In some embodiments, the reconstructed image may be stored in the storage unit 340.

The correction unit 330 may correct the reconstructed image. In some embodiments, the image may be derived from the reconstruction unit 320 or the storage unit 340. Merely by way of example, the correction unit 330 may remove or reduce artifacts in the reconstructed image. In some embodiments, the artifact may include a streak artifact, a ring artifact, a motion artifact, or the like, or any combination thereof. In some embodiments, the correction method may include an iterative method, an interpolation method, or the like, or any combination thereof.

The storage unit 340 may store the information processed by the processing unit 310, the image reconstructed by the reconstruction unit 320, and the image corrected by the correction unit 330. In some embodiments, the storage format may include text, picture, audio, video, code, or the like, or a combination thereof. In some embodiments, one or more algorithms that may be used during the processing, the reconstruction, or the correction may be stored in the storage unit 340. The algorithm may include a threshold segmentation method, an iterative method, an interpolation method, a statistical algorithm, a smoothing filtering method, or the like, or any combination thereof.

It should be noted that the above description of the processing module is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the assembly and/or function of the processing module may be varied or changed. In some embodiments, one or more units in the processing module 140 may include an independent storage block (not shown) respectively. In some embodiments, any two or more units may be integrated into an independent unit used to implement more than one functions. However, those variations and modifications do not depart from the scope of the present disclosure.

Figure 4:
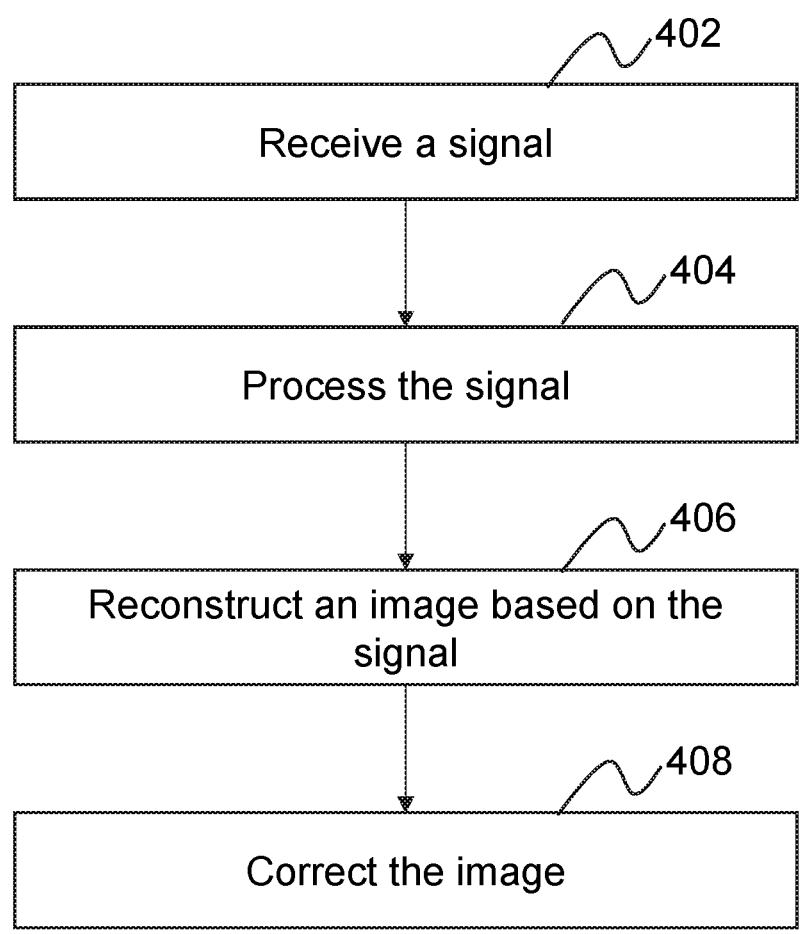
FIG. 4 is a flowchart illustrating a process for correcting an image according to some embodiments of the present disclosure.

FIG. 4 is a flowchart illustrating a process for correcting an image according to some embodiments of the present disclosure. In step 402, a signal may be received. The signal may be acquired by the acquisition module 110, or retrieved from the storage module 130 or an external resource including, for example, a floppy disk, a hard disk, a wired terminal, a wireless terminal, or the like, or any combination thereof. In some embodiments, the signal may be a CT signal.

In step 404, the signal may be processed. The processing may be performed by the processing unit 310. Merely by way of example, one or more interference factors (e.g., noises) may be removed or reduced. As another example, format of the signal may be changed, for example, the signal may be converted from an analog signal to a digital signal. As a further example, the signal may be amplified, filtered, or the like, or a combination thereof. In some embodiments, during the processing, one or more processing parameters may be set. The processing parameter(s) may include or relate to methods used to improve or adjust noises, processing speed, processing frequency, or the like, or a combination thereof.

In step 406, an image may be reconstructed based on the signal. The reconstruction may be performed by the reconstruction unit 320. The image may include a CT image, a SPECT image, or the like, or a combination thereof. In some embodiments, the image may relate to a portion of the subject (e.g., a head, a breast, a lung, a pleura, a mediastinum, an abdomen, a long intestine, a small intestine, a bladder, a gallbladder, a triple warmer, a pelvic cavity, a backbone, a blood vessel, or the like, or any combination thereof). In some embodiments, one or more reconstruction algorithms may be applied. Merely by way of example, an iterative process of forward projection and backward projection may be performed.

In step 408, the image may be corrected. The image may be corrected by the correction unit 330. In some embodiments, the correction process may be performed in an image domain or in a projection domain. In some embodiments, the correction process may be performed in a domain that may be switched at a time. Merely by way of example, a first step of the correction process may be performed in the image domain, and a second step of the correction process may be performed in the projection domain.

It should be noted that the above description is merely provided for the purposes of illustration, and not intended to limit the scope of the present disclosure. For persons having ordinary skills in the art, multiple variations or modifications may be made under the teachings of the present disclosure. For example, in some embodiments, step 404 may be unnecessary. As another example, step 404 and step 406 may be merged into an independent step in which the signal may be processed and the image may be reconstructed simultaneously or successively. As a further example, one or more other optional steps may be added into the exemplary process illustrated in FIG. 4. Examples of such steps may include storing or caching a received or processed signal, a reconstructed or corrected image, or the like. However, those variations and modifications do not depart from the scope of the present disclosure.

Figure 5:
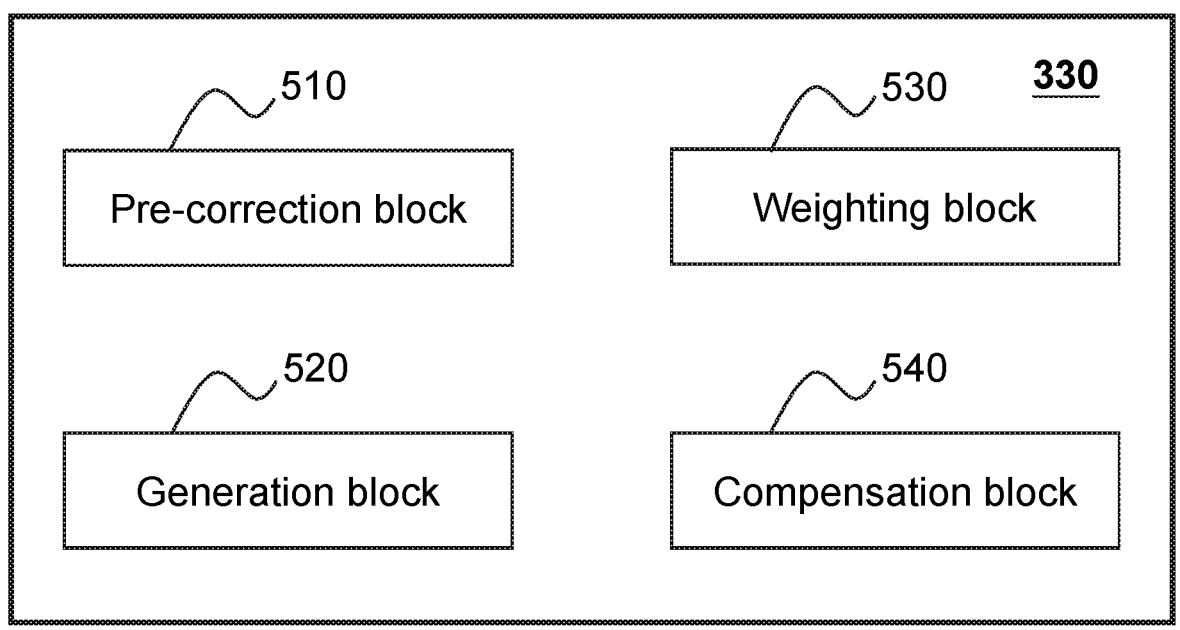
FIG. 5 is a block diagram illustrating an architecture of a correction unit according to some embodiments of the present disclosure.

FIG. 5 is a block diagram illustrating an architecture of a correction unit according to some embodiments of the present disclosure. As shown in FIG. 5, the correction unit 330 may include a pre-correction block 510, a generation block 520, a weighting block 530, and a compensation block 540. In some embodiments, at least two of the blocks may be connected with each other via a wired connection (e.g., a metal cable, an optical cable, a hybrid cable, or the like, or any combination thereof) or a wireless connection (e.g., a Local Area Network (LAN), a Wide Area Network (WAN), a Bluetooth, a ZigBee, a Near Field Communication (NFC), or the like, or any combination thereof). In some embodiments, the blocks may be connected with each other through a medium. The medium may include a visible medium or an invisible medium (e.g., radio, optical, sonic, electromagnetic induction, etc.).

The pre-correction block 510 may pre-correct an original image. The original image may be reconstructed by the reconstruction unit 320, or retrieved from the storage unit 340, an external resource (e.g., a hard disk, a floppy disk, a wireless terminal, or the like, or a combination thereof), or any storage disclosed anywhere in the present disclosure. In some embodiments, the original image may be a CT image that may be reconstructed by the reconstruction unit 320. In some embodiments, the pre-correction block 510 may pre-correct the original image by a pre-correction method. The pre-correction method may include an iterative reconstruction method, a projection interpolation method, or the like, or a combination thereof. In some embodiments, a pre-corrected image may be generated and transmitted to the generation block 520, and/or stored in a storage block (not shown).

The generation block 520 may generate correction data. As used herein, the correction data may include projection data of the original image, projection data of the pre-corrected image, an error image, or the like, or a combination thereof. As used herein, projection data may refer to two-dimensional data of an image that is projected onto a specific projection plane. As used herein, an error image may refer to an image that may include the difference between the original image and the pre-corrected image. For example, the error image may be generated by subtracting the pre-corrected image from the original image. In some embodiments, the correction data may further include information regarding the subject (e.g., name, age, gender, a medical history, or the like, or a combination thereof), a scanning parameter (e.g., intensity of the X-ray, current, voltage, or the like, or a combination thereof), a reconstruction parameter (e.g., a reconstruction method, etc.), or the like, or a combination thereof.

The weighting block 530 may perform a weighting operation on the original image and/or the pre-corrected image based on the correction data and generate a corrected image (also referred to as a "correction process"). As used herein, "weighting" may refer to assigning a weighting factor to a parameter including, for example, a greyscale value of a pixel, projection data of the pixel, etc. For instance, performing a weighting operation with respect to an image may including assigning weighting factors to the greyscale values of various pixels in the image. As another example, performing a weighting operation with respect to two images including a first image and a second image may include assigning weighting factors to greyscale values of pixels in the first image and greyscale values of corresponding pixels in the second image. As used herein, a corresponding pixel of a pixel in the first image may refer to a pixel in the second image whose coordinates are the same with that of the pixel in the first image. In some embodiments, the weighting operation may be performed in a projection domain or in an image domain. For example, the original image and the pre-corrected image may be weighted in projection domain based on projection data of the original image and that of the pre-corrected image. As another example, the original image and the error image may be weighted in an image domain. In some embodiments, the weighting block 530 may determine one or more weighting coefficients for the weighting operation. For example, a plurality of weighting coefficients corresponding to pixels in the error image may be determined.

The compensation block 540 may perform a compensation on the corrected image. As used herein, a compensation may refer to that useful information lost during the correction process may be compensated in the corrected image. For example, a high frequency part may be extracted from the original image and compensated in the corrected image.

It should be noted that the above description is provided for the purposes of illustration, not intended to limit the scope of the present disclosure. For persons having ordinary skills in the art, multiple variations and modifications may be reduced to practice in the light of the present disclosure. For example, any two or more blocks in the correction unit 330 may be integrated into an independent block. As another example, the compensation block 540 may be unnecessary. As a further example, the correction unit 330 may include a storage block (not shown), or the blocks in the correction unit 330 may include an independent storage sub-block respectively. However, those variations and modifications do not depart from the scope of the present disclosure.

Figure 6:
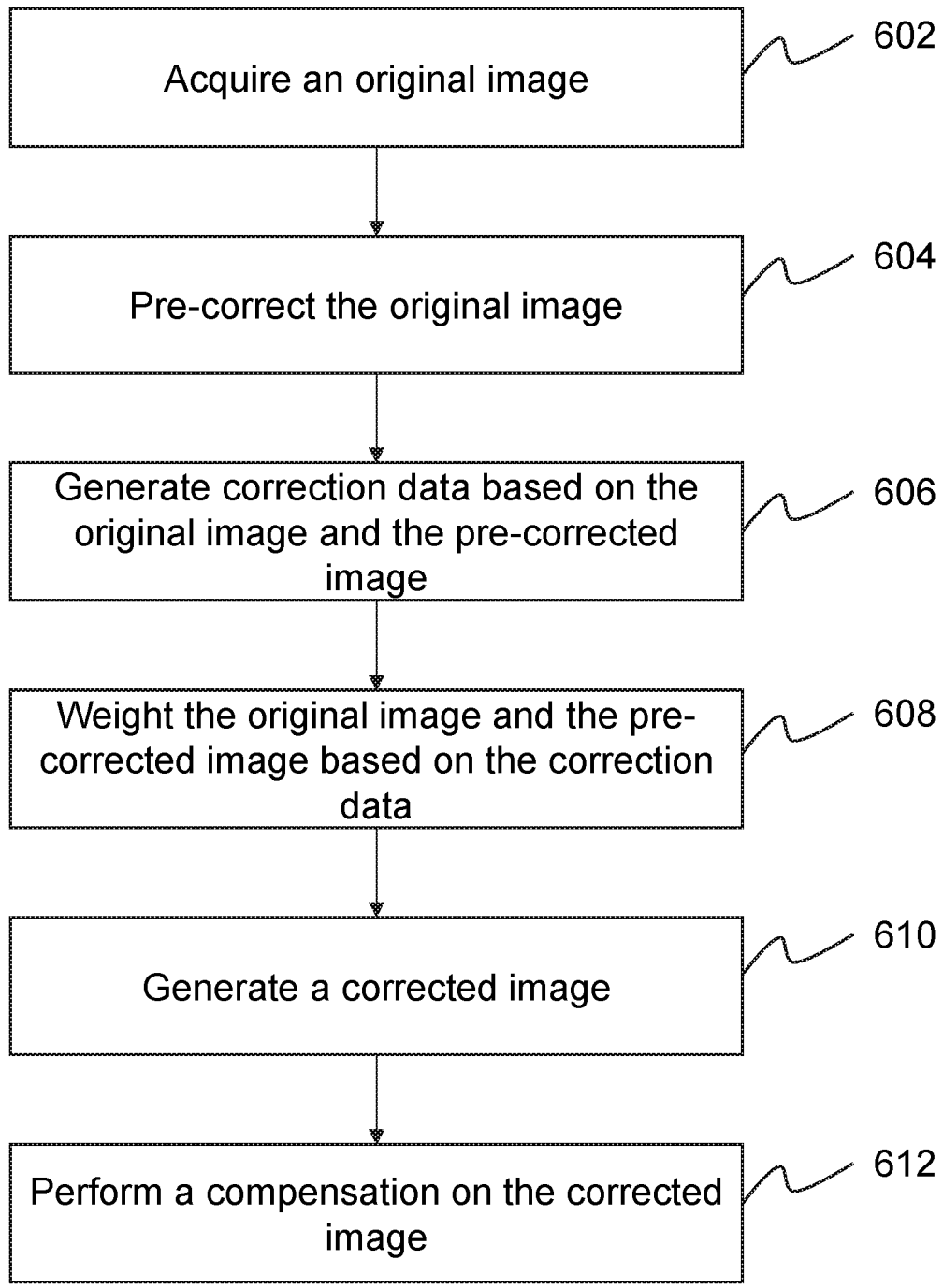
FIG. 6 is a flowchart illustrating a process for image correction according to some embodiments of the present disclosure.

FIG. 6 is a flowchart illustrating a process for image correction according to some embodiments of the present disclosure. The process for image correction may be performed by the correction unit 330. In step 602, an original image may be acquired. The original image may be acquired from the reconstruction unit 320, the storage unit 340, an external resource (e.g., a hard disk), or any storage disclosed anywhere in the present disclosure. Merely by way of example, the original image may be a CT image. The CT image may be reconstructed based on a CT signal acquired by a CT scanning performed on a subject. The CT scanning may be performed by the acquisition module 110 or a CT scanner that may communicate with the acquisition module 110. In some embodiments, the CT scanning may be performed on a portion (e.g., a head, a lung, an abdomen, a breast, a pleura, or the like) of the subject. In some embodiments, the original image may be presented in a field of view (FOV). The FOV may include a default FOV, a full FOV, or an adjusted FOV. For example, if in the default FOV, a region including artifact(s) to be corrected is hidden, a full FOV may be needed. In some embodiments, the format of the original image may include Bitmap (BMP), Joint Photo Graphic Experts Group (JPEG), Tagged Image File Format (TIFF), Graphics Interchange Format (GIF), Portable Network Graphic (PNG), Exchangeable Image File (EXIF), or the like, or a combination thereof.

In step 604, the original image may be pre-corrected by a pre-correction method. The pre-correction may be performed by the pre-correction block 510. The pre-correction may be performed in a projection domain or in an image domain. The pre-correction method may include an iterative reconstruction method, a projection interpolation method, or the like, or a combination thereof. For example, by the projection interpolation method, region(s) with artifact(s) may be removed and replaced by an interpolation of projection data in a nearby region. As another example, in the iterative reconstruction method, raw projection data that do not include artifact(s) (e.g., a metal artifact) may be used. An initial image may be retrieved and projection data of the initial image may be compared with the raw projection data. Then the initial image may be iteratively updated in order to approach the raw projection data. Finally, a pre-corrected image may be obtained. In some embodiments, the initial image may be an empty image or the original image to be corrected. Examples of iterative reconstruction methods may include algebraic reconstruction technique (ART), simultaneous algebraic reconstruction technique (SART), iterated filter back-projection (IFBP), statistical iterative image reconstruction techniques, or the like, or a combination thereof. Description regarding the iterative reconstruction method may be found in, for example, Wang et al., "Iterative deblurring for CT metal artifact reduction," IEEE Transactions on Medical Imaging, 15(5): 657-664 (1996), which is hereby incorporated by reference.

In step 606, correction data may be generated based on the original image and the pre-corrected image. The correction data may be generated by the generation block 520. In some embodiments, the correction data may include projection data of the original image, projection data of the pre-corrected image, an error image, projection data of the error image, or the like, or a combination thereof. As used herein, an error image may refer to an image that may include the difference between the original image and the pre-corrected image. For example, the error image may be generated by subtracting the pre-corrected image from the original image.

In step 608, the original image and the pre-corrected image may be weighted based on the correction data. The weighting operation may be performed by the weighting block 530. The weighting operation may be performed in a projection domain or in an image domain. In some embodiments, the projection data of the original image and/or the projection data of the pre-corrected image may be weighted in the projection domain. In some embodiments, the original image and/or the error image may be weighted in an image domain. In some embodiments, the original image and/or the error image may be weighted in a projection domain. In some embodiments, one or more weighting coefficients may be determined for the weighting operation.

In step 610, a corrected image may be generated. The corrected image may be generated by the weighting block 530. In some embodiments, the corrected image may be generated by transforming the weighted projection data of the original image and/or that of the pre-corrected image to an image domain. In some embodiments, the corrected image may be directly generated by weighting the error image and the original image.

In step 612, compensation may be performed on the corrected image. The compensation may be performed by the compensation block 540. In some embodiments, the compensation may be performed by fusing a high frequency part of the original image, and/or a high frequency part of the corrected image, and/or a low frequency part of the corrected image. For example, the high frequency part of the original image may be segmented and combined into the corrected image. In some embodiments, a weighing mask may be used on the original image. The weighting mask may include weighting coefficients for various pixels in the original image. For example, for a pixel close to a metal artifact, a relatively large weighting coefficient (e.g., close to 1) may be chosen; for a pixel distant to a metal artifact, a relatively small weighting coefficient (e.g., transitioning from 1 to 0) may be chosen.

It should be noted that the above description is merely provided for the purposes of illustration, and not intended to limit the scope of the present disclosure. For persons having ordinary skills in the art, multiple variations or modifications may be made under the teachings of the present disclosure. For example, one or more other optional steps may be added between any two steps in the exemplary process illustrated in FIG. 6. Examples of such steps may include storing or caching a received or processed signal, a reconstructed or corrected image, or the like. As another example, step 608 and step 610 may be merged into an independent step in which the weighting operation and the generation of the corrected image may be performed simultaneously or successively. However, those variations and modifications do not depart from the scope of the present disclosure.

Figure 7:
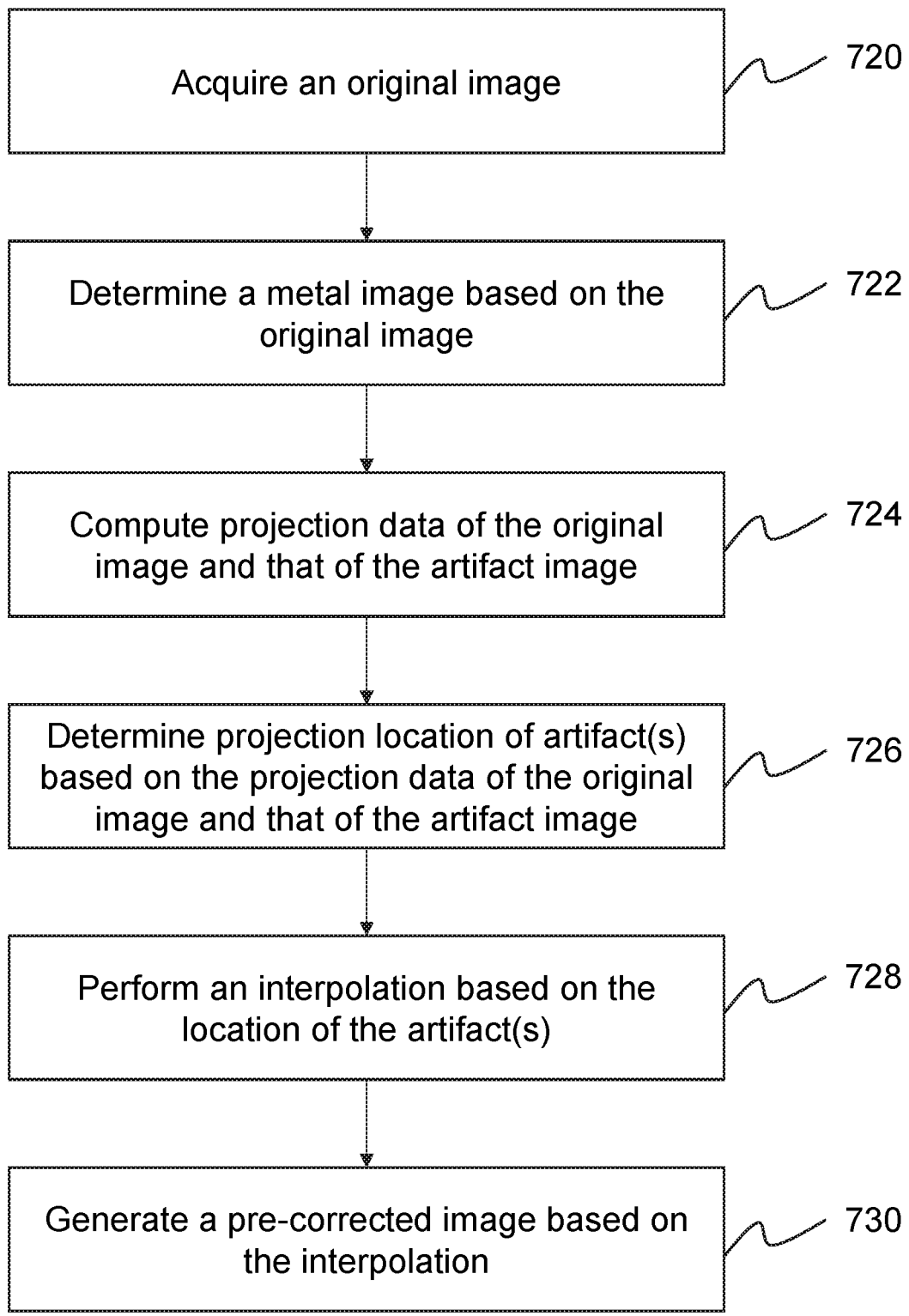
FIG. 7 is an exemplary flowchart illustrating a process for pre-correcting an image according to some embodiments of the present disclosure.

FIG. 7 is an exemplary flowchart illustrating a process for pre-correcting an image according to some embodiments of the present disclosure. The pre-correction process may be performed by the pre-correction block 510. For illustration purposes, a pre-correction for an original image including metal artifact(s) may be described below.

In step 720, an original image may be acquired. The original image may be acquired from the reconstruction unit 420, the storage unit 340, or any storage disclosed anywhere in the present disclosure. In step 722, a metal image may be determined. As used herein, a metal image may refer to an image including only metal information of the original image. In general, the X-ray absorption property of metal (e.g., a metal object) may be higher than that of a tissue or bone of the subject, and therefore the attenuation coefficient of metal may be higher than that of a tissue or bone. A streak artifact or a starburst artifact may be generated in the original image due to the difference of the attenuation coefficient of metal and the attenuation coefficient of a tissue or bone of the subject. In the original image, the CT value (also referred to as "CT HU (Hounsfield unit)) of the metal artifact may be higher than that of the tissue or bone of the subject.

In some embodiments, the metal image may be determined by a segmentation method. Exemplary segmentation methods may include a thresholding method, a clustering method, a compression-based method, a histogram-based method, an edge detection method, or the like, or the like, or any combination thereof. As an example, the metal image may be determined according to Formula (1):

$$I_{metal} = \begin{cases} Iori & \text{if } Iori > T_{metal} \\ 0 & \text{else} \end{cases}, \quad (1)$$

where $I_{metal}$ may represent a set of CT values of pixels in the metal image, Iori may represent a set of CT values of the pixels in the original image, Tmetal may represent a segmentation threshold. If the CT value of a pixel in the original image exceeds the segmentation threshold $T_{metal}$, the pixel may be determined as a metal pixel in the metal image. Besides the metal pixels, CT values of other pixels in the metal image may be set as 0.

In some embodiments, the segmentation threshold may be adjusted according to an adjusting parameter. The adjusting parameter may include or relate to the portion that is scanned (e.g., the head, the neck, or the like), the scanning voltage, the scanning current, the convolution kernel used during the reconstruction, or the like, or a combination thereof. For example, for an original image acquired from body of a subject by a scanning voltage of 120 keV and reconstructed by a smooth convolution kernel, the segmentation threshold may be selected from a range of 2500-2800 Hounsfield unit (HU).

In step 724, the projection data of the original image and the projection data of the metal image may be computed. In some embodiments, a projection operation may be performed on the original image and/or the metal image. In some embodiments, during the reconstruction of the original image, the acquired signal may be transformed to the projection domain and corresponding projection data may be generated. The generated projection data may be stored in any storage disclosed anywhere in the present disclosure. Therefore, in step 724 the projection data of the original image may be retrieved from the storage.

In step 726, the projection region of the artifact(s) in the projection domain may be determined based on the projection data of the original image and that of the metal image. In some embodiments, the projection region of the artifact(s) may be determined by comparing the difference between the projection data of the original image and that of the metal image.

In step 728, an interpolation may be performed based on the projection region of the artifact(s) in the projection domain. In some embodiments, the interpolation may be performed in the projection data of the original image, or in the difference between the projection data of the original image and that of the metal image. In some embodiments, the interpolation method may include linear interpolation, polynomial interpolation, spline interpolation, or the like, or a combination thereof.

As an example, a linear interpolation may be performed on the difference between the projection data of the original image and that of the metal image. The linear interpolation may be described in Formula (2):

$$Pcorr1_{p,k} = Pdiff_{p,S}\frac{E-K}{E-S} + Pdiff_{p,E}\frac{K-S}{E-S}, \qquad (2)$$

where P may represent an projection angle, S may represent a start channel of the projection region of the artifact(s), E may represent an end channel of the projection region of the artifact(s), and K may represent a specific channel of the projection region of the artifact(s). $Pcorr1_{p,k}$ may represent the projection data of the channel K at the projection angle P after the interpolation, $Pdiff_{p,S}$ may represent projection data of the start channel S at the projection angle P, and $Pdiff_{p,E}$ may represent projection data of the end channel E at the projection angle P.

After the interpolation, pre-corrected projection data may be generated. In some embodiments, the pre-corrected projection data may be stored in any storage disclosed anywhere in the present disclosure and may be loaded if needed. In some embodiments, a pre-corrected image may be generated based on the pre-corrected projection data in step 730. The pro-corrected image may be stored in any storage disclosed anywhere in the present disclosure and may be loaded if needed.

It should be noted that the above description is merely provided for the purposes of illustration, and not intended to limit the scope of the present disclosure. For persons having ordinary skills in the art, multiple variations or modifications may be made under the teachings of the present disclosure. For example, the pre-corrected method may further include iterative reconstruction method (e.g., see FIG. 6) or a combination of the iterative reconstruction method and the interpolation method. As another example, the interpolation method may further include polynomial interpolation, spline interpolation, or the like, or a combination thereof. However, those variations and modifications do not depart from the scope of the present disclosure.

Figure 8:
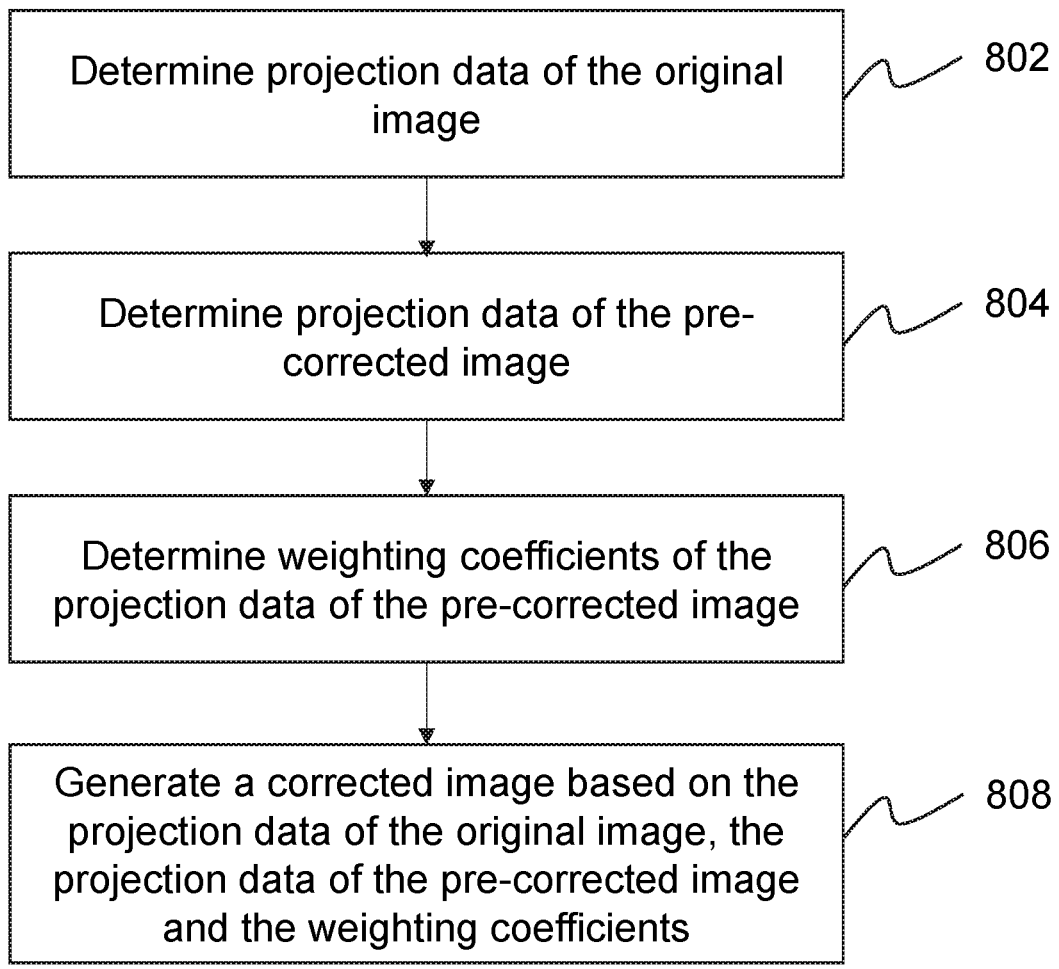
FIG. 8 is a flowchart illustrating a process for image correction according to some embodiments of the present disclosure.

FIG. 8 is a flowchart illustrating a process for image correction according to some embodiments of the present disclosure. In step 802, projection data of the original image may be determined. As described in FIG. 7, the projection data of the original image may be retrieved from any storage disclosed anywhere in the present disclosure, or generated by transforming the original image from the image domain to the projection domain. In some embodiments, the projection data of the original image may be referred to as the "first projection data."

In step 804, projection data of the pre-corrected image may be determined. As described in FIG. 7, during the pre-correction, the projection data of the pre-corrected image may be generated. Therefore, in some embodiments, the projection data of the pre-corrected image also may be retrieved from the results obtained in a previous step. In some embodiments, the projection data of the pre-corrected image may be determined by transforming the pre-corrected image from the image domain to the projection domain. In some embodiments, the projection data of the pre-corrected image may be referred to as the "second projection data."

In step 806, weighting coefficients (e.g., $W_{p,k}$ in Formula (4)) of the projection data of the pre-corrected image may be determined. As described in FIG. 7, in the pre-corrected image, the pixels corresponding to the artifact(s) may be pre-corrected or replaced. However, during the pre-correction, some original useful information (e.g., data regarding tissues or bones) may be lost. Therefore, a weighting operation may be needed to be performed on the original image and the pre-corrected image, in order to compensate the lost useful information. In some embodiments, the weighting coefficients may be pre-selected empirical values, values selected according to a default setting of the system 100, values determined based on features (e.g., shape, size, etc.) of specific artifact(s) (see, for example, FIG. 9 and the description thereof), etc.

Merely by way of example, for an original image including metal artifact(s), the weighting coefficients of the projection data of the pre-corrected image may be adjusted according to a weighting intensity as shown in Formula (3) below:

$$W_{p,k} = \qquad (3)$$
$$1 + W_0 * \left(0.5 * \sin\left(\pi \frac{1 - \max(Pmetal_{p,k}/\max(Pmetal), (1-W_0))}{W_0} + k + 0.5*\pi\right) - 0.5\right),$$

where $W_0$ may represent the weighting intensity, $Pmetal_{p,k}$ may represent the projection data of the metal image corresponding to channel K and projection angle P, max(Pmetal) may represent the maximum value of the projection data of the metal image. In some embodiments, $W_0$ may be an empirical value (e.g., 1). In some embodiments, the value of $W_0$ may be determined based on the shape of the metal (see, for example, FIG. 9 and the description thereof).

In step 808, a corrected image may be generated based on the projection data of the original image, the projection data of the pre-corrected image, and the weighting coefficients determined in step 806. In some embodiments, a weighting operation may be performed according to Formula (4):

$$Pcorr_{p,k} = W_{p,k} Pcorr1_{p,k} + (1 - W_{p,k}) Pori_{p,K}, \qquad (4)$$

where $Pcorr_{p,k}$ may represent a weighted result of the projection data of the original image and the projection data of the pre-corrected image. In some embodiments, the weighted result $Pcorr_{p,k}$ may be referred to as the "third projection data". $Pori_{p,k}$ may represent the projection data of the original image (also referred to as the "first projection data") corresponding to channel K and projection angle P, $Pcorr1_{p,k}$ may represent the projection data of the pre-corrected image (also referred to as the "second projection data") corresponding to channel K and projection angle P, and $W_{P,K}$ may represent the weighting coefficient of the projection data of the pre-corrected image corresponding to channel K and projection angle P.

In some embodiments, the corrected image may be generated by performing a backward projection (i.e., transforming from the projection domain to the image domain) on the third projection data.

In some embodiments, before the corrected image is generated, the third projection data may be further corrected. For example, a smoothing operation and/or an interpretation may be performed on the first projection data (also referred to as "the projection data of the original image") based on the third projection data.

Merely by way of example, difference between the first projection data and the third projection data may be determined. A backward projection (i.e., transforming from the projection domain to the image domain) may be performed on the difference, and a first intermediate metal image may be generated. An intermediately corrected image may be generated by subtracting the first intermediate metal image and the metal image from the original image.

In some embodiments, a segmentation operation may be performed on the intermediately corrected image to obtain a model image. In some embodiments, the segmentation operation may be performed by a thresholding method as shown in Formula (5) below:

$$I_{model} = \begin{cases} 0, & I \leq T_{tissue} \\ 1000, & T_{tissue} \leq I \leq T_{bone}, \\ 1, & I \geq T_{bone} \end{cases} \qquad (5)$$

where $I_{model}$ may represent a set of CT values of pixels in the model image, $T_{tissue}$ may represent a tissue threshold, and $T_{bone}$ may represent a bone threshold. In some embodiments, the tissue threshold $T_{bone}$ and the bone threshold $T_{bone}$ may be determined based on a default setting of the system 100, or set by an operator (e.g., a doctor, an imaging technician, etc.).

In some embodiments, projection data of the model image may be generated. A smoothing operation may be performed on the first projection data based on the projection data of the model image. As used herein, a smoothing operation may refer to an operation performed on the projection data to flat the projection data. In some embodiments, smoothed projection data may be generated by subtracting the projection data of the model image from the first projection data. In some embodiments, the smoothed projection data may be generated by dividing the first projection data by the projection data of the model image. After the smoothing process, an interpolation (e.g., a linear interpolation) may be performed based on the smoothed projection data, and the projection data of the metal image. Interpolated data may be generated based on the interpolation. Next, an inverse operation may be performed on the interpolated data. For example, if the smoothed projection data is generated by a subtraction process, the inverse operation may include summing the interpolated data and the projection data of the model image to obtain a fourth projection data. As another example, if the smoothed projection data is generated by a division process, the inverse operation may include multiplying the interpolated data with the projection data of the model image to obtain the fourth projection data.

In some embodiments, the system may determine whether a weighting operation may be needed to perform on the first projection data and the fourth projection data. If the answer is "yes," the system may determine the weighting coefficients of the fourth projection data according to, for example, the method illustrated in step 806. Based on the weighting operation, fifth projection data may be generated based on the first projection data and the fourth projection data. A further corrected image may be generated based on the fifth projection data. If the answer is "no," the further corrected image may be generated based on the fourth projection data. The further corrected image may be generated according to any method disclosed anywhere in the present disclosure. For example, difference between the first projection data and the fourth projection data or the fifth projection data may be determined. A second intermediate metal image may be generated based on the difference by a backward projection. The further corrected image may be generated by subtracting the second intermediate metal image and the metal image from the original image.

It should be noted that the flowchart described above is provided for the purposes of illustration, and not intended to limit the scope of the present disclosure. For persons having ordinary skills in the art, various variations and modifications may be conducted under the teaching of the present disclosure. For example, a still further correction similar with the correction process (e.g., a smoothing operation, an interpolation operation, a weighting operation, or the like, or a combination thereof) may be performed on the fifth projection data. However, those variations and modifications may not depart from the protecting of the present disclosure.

Figure 9:
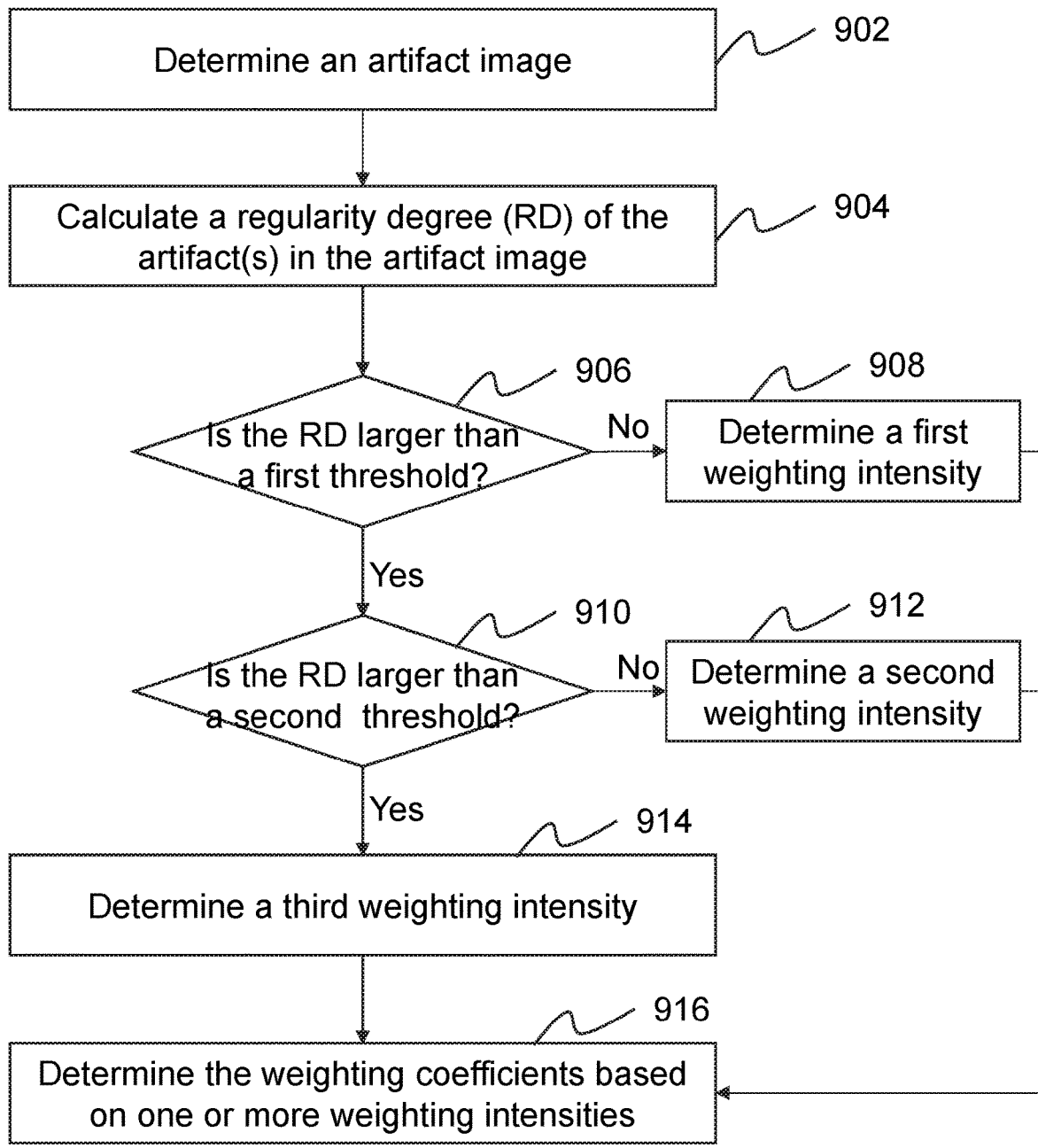
FIG. 9 is a flowchart illustrating a process for determining the weighting coefficients of the projection data of the pre-corrected image according to some embodiments of the present disclosure.

FIG. 9 is a flowchart illustrating a process for determining the weighting coefficients of the projection data of the pre-corrected image according to some embodiments of the present disclosure. In some embodiments, the weighting coefficients of the projection data of the pre-corrected image may be determined based on the shape of the artifacts. For example, during the acquisition process, different metal objects (e.g., a pin used in a hip, a surgical clip, a dental filling, or the like) may result in metal artifacts with different shapes in the original image. The shape of the artifact(s) may affect the quantity of the useful information lost during the pre-correction process.

In step 902, a metal image may be determined. As described in FIG. 7, the metal image may be determined based on a threshold segmentation. In step 904, a regularity degree (RD) of the metal(s) in the metal image may be calculated. Take the metal artifact as an example, if the shape of the metal object that may give rise to metal artifact(s) is a circle, projection area of the metal artifact resulted from the metal object with a regular shape may be fixed along any projection plane. The projection area may be defined as an ideal projection area. The ideal projection area may be calculated according to Formula (6) below:

$$S_{IdealPmetal} = \left\lceil \frac{2*Space_{pixel}\sqrt{S_{Imetal/\pi}}}{Space_{channel}} \right\rceil *N_{view}, \quad (6)$$

where $S_{IdealPmetal}$ may represent the ideal projection area, $S_{Imetal}$ may represent the number of pixels in the metal image, $Space_{pixel}$ may represent the pixel resolution, $Space_{channel}$ may represent the channel resolution, and $N_{view}$ may represent the number of the projection angles.

The regularity degree (RD) of the metal artifact(s) may be calculated by comparing the actual projection area of the metal artifact(s) in the metal image and the ideal projection area. The regularity degree (RD) of the metal artifact(s) may be defined by Formula (7):

$$RD = \frac{S_{Pmetal}}{S_{IdealPmetal}}, \quad (7)$$

where $S_{Pmetal}$ may represent the actual projection area of the metal artifact(s) in the metal image.

As described, the closer to 1 the RD may be, the closer to the ideal projection area the metal artifact(s) may be, it may indicate that during the pre-correction (see, e.g., an interpolation as described in FIG. 7), the less the lost useful information may be. Otherwise the more far away from 1 the RD may be, the more far away from the ideal projection area the metal artifact(s) may be, it may indicate that during the pre-correction, the more the lost useful information may be.

In step 906, a determination may be made as to whether the RD exceeds a first threshold. If the answer is "no," the process may proceed to step 908 to determine a first weighting intensity. If the answer is "yes," the process may proceed to step 910 to determine whether the RD exceeds a second threshold. In step 910, if the RD exceeds a first threshold but is below a second threshold, the process may proceed to step 912 to determine a second weighting intensity. If the RD exceeds a second threshold, the process may proceed to step 914 to determine a third weighting intensity.

In some embodiments, the first threshold and the second threshold may be empirical values, set according to a default setting of the system 100, or set by an operator (e.g., a doctor, an imaging technician, etc.). For example, the first threshold may be set as 1-1.8, and the second threshold may be set as 1.8-2.2. In some embodiments, the first weighting intensity, the second weighting intensity, and the third weighting intensity may be empirical values, set according to a default setting of the system 100, or set by an operator (e.g., a doctor, an imaging technician, etc.). For example, the first weighting intensity may be set as zero (i.e., no weighting may be performed), the second weighting intensity may be set as a value between 0 and 0.5, and the third weighting intensity may be set as a value between 0.5 and 1.

In step 916, the weighting coefficients may be determined based on the one or more weighting intensities. In some embodiments, as the weighting intensity $W_0$ is determined, the weighting coefficients of the projection data of the pre-corrected image may be determined according to Formula (3).

It should be noted that the flowchart described above is provided for the purposes of illustration, and not intended to limit the scope of the present disclosure. For persons having ordinary skills in the art, various variations and modifications may be conducted under the teaching of the present disclosure. For example, one or more optional steps may be added before step 916, such as in which a third threshold may be set and a fourth weighting intensity may be determined.

However, those variations and modifications may not depart from the protecting of the present disclosure.

Figure 10:
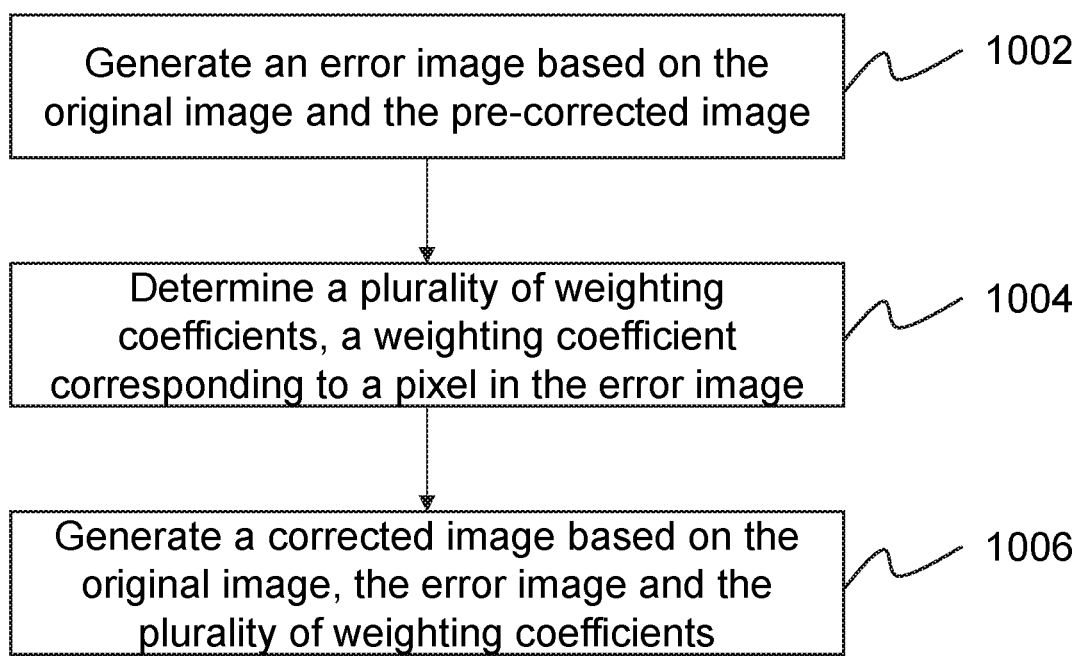
FIG. 10 is a flowchart illustrating a process for image correction according to some embodiments of the present disclosure.

FIG. 10 is a flowchart illustrating a process for image correction according to some embodiments of the present disclosure. In step 1002, an error image may be generated based on the original image and the pre-corrected image. In some embodiments, the error image may be defined as:

$$Ierr=Iori-Icorr, \quad (8)$$

where Iori may represent the original image, Icorr may represent the pre-corrected image, and Ierr may represent the error image.

In step 1004, a plurality of weighting coefficients may be determined. A weighting coefficient may correspond to a pixel in the error image. As described in FIG. 7, the pre-corrected image may be generated by a pre-correction process. In some embodiments, during the pre-correction process, some additional artifacts may be introduced. Therefore, different weighting coefficients may be determined for different pixels in the error image. For example, the weighting coefficient of a pixel corresponding to additional artifact(s) may be smaller than the weighting coefficient of a pixel corresponding to the artifact(s) in the original image. In some embodiments, the weighting coefficient of a pixel in the error image may be determined based on the information entropy of a corresponding pixel in the pre-corrected image. More details may be found in FIG. 11 and the description thereof.

In step 1006, a corrected image may be generated based on the original image, the error image, and the plurality of weighting coefficients. As shown in step 1004, the weighting coefficients of the pixels in the error image may be determined. To acquire the corrected image, a weighting operation may be performed on the error image and the original image according to the determined weighting coefficients.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
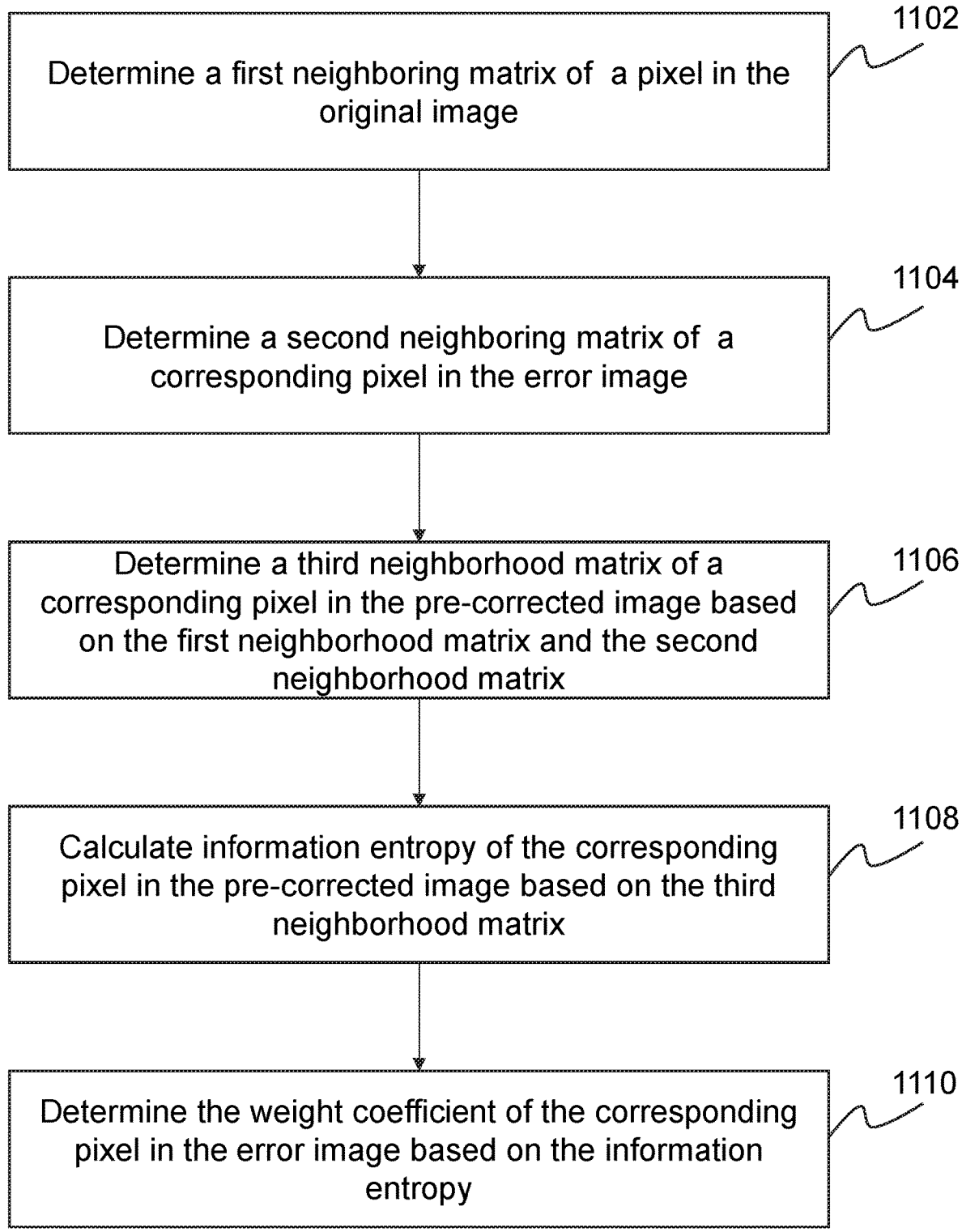
FIG. 11 is a flowchart illustrating a process for determining the weighting coefficient of a pixel in the error image according to some embodiments of the present disclosure.

FIG. 11 is a flowchart illustrating a process for determining the weighting coefficient of a pixel in the error image according to some embodiments of the present disclosure.

As used herein, an error image may refer to an image that may include the difference between the original image and the pre-corrected image. As used herein, an error image may refer to an image that may include the difference between the original image and the pre-corrected image. The process for determining weighting coefficients may be performed by the weighting block 530. In step 1102, a first neighboring matrix (also referred to as "neighborhood matrix") of a pixel (also referred to as "a first pixel") in the original image may be determined. For example, there may be N×N pixels in the original image Iori, and a first neighboring matrix $N_{p,k}$(Iori) of a pixel (p, k) may be determined.

In step 1104, a second neighboring matrix of a corresponding pixel (also referred to as "a second pixel") in the error image may be determined. For example, for the error image Ierr, a second neighboring matrix $N_{p,k}$(Ierr) for a corresponding pixel (p, k) in the error image may be determined.

In some embodiments, the size of the first neighboring matrix or the second neighboring matrix may affect the computing speed and/or the correction effect. For example, the smaller the size of the neighboring matrix is, the faster the computational speed may be, but the lower the correction effect may be. On the contrary, the larger the size of the neighboring matrix is, the better the correction effect may be, but the lower the computational speed may be. In some embodiments, the size of the first neighboring matrix or the size of the second neighboring matrix may be determined based on a feature of the error image (or called a "correction effect of the pre-correction process"). For example, the better the correction effect of the pre-correction process is, the larger the size of the neighboring matrix may be. That is, the more the artifact(s) is in the error image, the larger size of the neighboring matrix may be. In some embodiments, the size of a neighboring matrix may be set according to a default setting of the system 100 (e.g., 9-31 pixels), or determined based on the regularity degree of an artifact(s). As described in FIG. 9, the RD may be determined by comparing the actual projection area of the artifact(s) with the ideal projection area. In some embodiments, the system may set an RD threshold. When the regularity degree (RD) is below the RD threshold, the size of the neighboring matrix may be set as a smaller value (e.g., 9 pixels); otherwise, if the regularity degree (RD) exceeds the RD threshold, the size of the neighboring matrix may be set as a larger value (e.g., 31 pixels). In some embodiments, for a pixel near an edge of an image (e.g., the original image or the error image), a corresponding neighboring matrix may be determined by filling some zero pixels to extend the edge of the image. In some embodiments, the size of the first neighboring matrix of the pixel in the original image is equal to that of the second neighboring matrix of the pixel in the error image.

In step 1106, a third neighboring matrix of a corresponding pixel (also referred to as "a third pixel") in the pre-corrected image may be determined based on the first neighboring matrix and/or the second neighboring matrix. As shown in Formula (9), the third neighboring matrix $N_{p,k}$(Icw) of the corresponding pixel (p, k) in the pre-corrected image may be generated:

$$N_{p,k}(Icw)=N_{p,k}(Iori)-W_{p,k}\times N_{p,k}(Ierr), (p,k)\in N\times N;$$
$$0\le W_{p,k}\le 1, \quad (9)$$

where Icw may represent the pre-corrected image, and $W_{p,k}$ may represent the weighting coefficient of the pixel (p, k) in the error image.

In step 1108, information entropy of the corresponding pixel in the pre-corrected image may be calculated based on the third neighboring matrix. The calculation of the information entropy may be based on Formula (10):

$$\text{Entropy}(N_{p,k}(Icw))=-\Sigma_{i=1}^{n}P(N_{p,k}(Icw))\log_2 P(N_{p,k}(Icw))), \quad (10)$$

where Entropy ($N_{p,k}$(Icw)) may represent the information entropy of the corresponding pixel (p, k) in the pre-corrected image, $P(N_{p,k}$(Icw)) may represent the prior probability function of the corresponding pixel in the pre-corrected image, i may represent a pixel in the neighboring matrix, and n may represent the total number of the pixels in the neighboring matrix. In some embodiments, the prior probability function $P(N_{p,k}$(Icw)) may be acquired by a histogram. For example, the pixel grey values in an image may be analyzed, and the percentages of the pixel grey values in the image may be determined.

In step 1110, the weighting coefficient of the corresponding pixel in the error image may be determined based on the calculated information entropy. In some embodiments, according to Formula (11) below, the weighting coefficient $W_{p,k}$ of the corresponding pixel (p, k) in the error image may be determined by calculating the minimum information entropy, $$W_{p,k}=\arg_w \min(\text{Entropy}(N_{p,k}(Icw))). \quad (11)$$

In some embodiments, the weighting coefficients of other pixels in the error image may be determined in the same way. After the plurality of weighting coefficients corresponding to the pixels in the error image are determined, a weighting operation may be performed on the error image and the original image so that a corrected image may be generated.

It should be noted that the above description is merely provided for the purposes of illustration, and not intended to limit the scope of the present disclosure. For persons having ordinary skills in the art, multiple variations or modifications may be made under the teachings of the present disclosure. For example, step 1102 and step 1104 may be merged into an independent step in which the first neighboring matrix and the second neighboring matrix may be determined simultaneously. However, those variations and modifications do not depart from the scope of the present disclosure.

Figure 12:
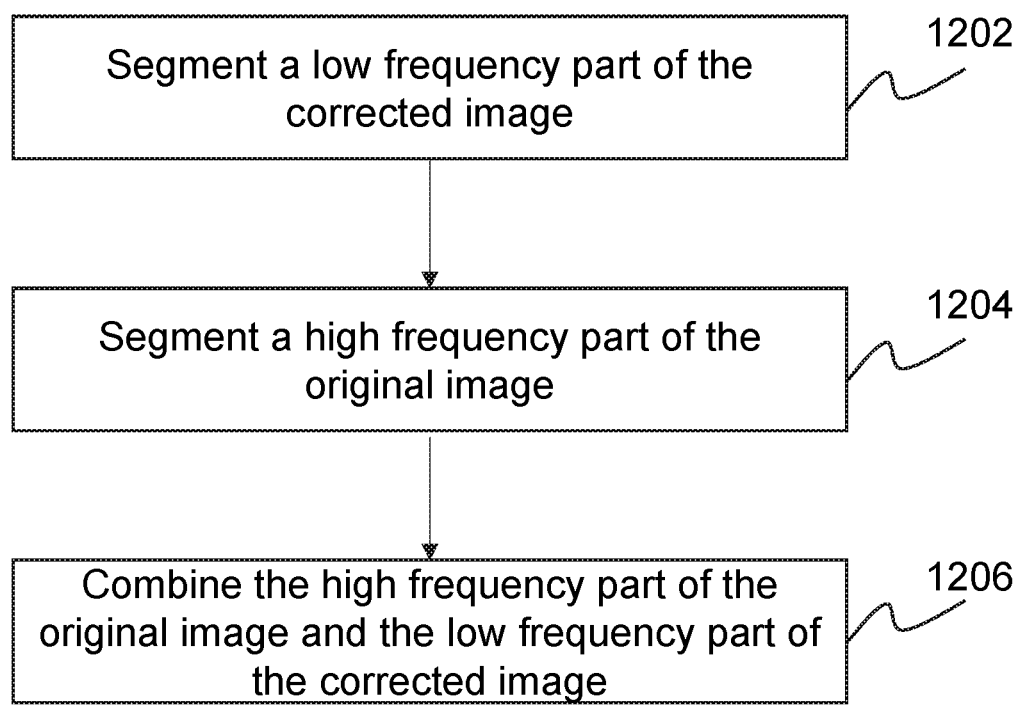
FIG. 12 is a flowchart illustrating a process for image compensation according to some embodiments of the present disclosure.

FIG. 12 is a flowchart illustrating a process for image compensation according to some embodiments of the present disclosure. The compensation operation may be performed by the compensation block 540. In some embodiments, some high frequency information may be lost in the corrected image. For example, as described in FIG. 10, the corrected image may be generated by weighting the error image and the original image according to a plurality of weighting coefficients. During the weighting process, a mosaic effect may be introduced into the corrected image. Therefore, a compensation may be performed.

In step 1202, a low frequency part of the corrected image may be segmented. In some embodiments, the artifact(s) may be low frequency component(s) in an image, and edge information of an organ may be high frequency component in the image. In some embodiments, a low frequency part of the corrected image may be acquired by performing a low pass filtering on the corrected image. The low pass filter may include, for example, a Gaussian low pass filter, a Butterworth low pass filter, a Chebyshev low pass filter, or the like, or a combination thereof. As an example, the low pass filtering may be performed by a Gaussian low pass filter G(σ) according to Formula (12):

$$G(\sigma) = e^{\frac{-x^2}{2}} \Big/ 2\sigma^2, \quad (12)$$

where σ is an empirical value, and x may represent the distance. For instance, the range of σ may be 1.2-1.3.

The low frequency part of the corrected image may be segmented according to Formula (13):

$$Icorr2Low = Icorr2 * G(\sigma), \quad (13)$$

where Icorr2 may represent the corrected image, and Icorr2Low may represent the low frequency part of the corrected image. In some embodiments, a high frequency part of the corrected image may be obtained by subtracting the low frequency part from the corrected image.

In step 1204, a high frequency part of the original image may be segmented. Firstly, a low frequency part of the original image may be segmented according to Formula (14):

$$IoriLow = Iori * G(\sigma), \quad (14)$$

where Iori may represent the original image, and IoriLow may represent the low frequency part of the original image. Secondly, the high frequency part of the original image may be obtained according to Formula (15):

$$IoriHigh = Iori - IoriLow, \quad (15)$$

where IoriHigh may represent the high frequency part of the original image.

In step 1206, the high frequency part of the original image, the high frequency part of the corrected image, and the low frequency part of the corrected image may be fused. In some embodiments, a final corrected image may be generated based on the compensation. In some embodiments, the high frequency part of the original image may include noise(s). In order to reduce the noise(s), a weighting mask may be generated with respect to the high frequency part of the original image. The weighting mask may include weighting coefficients for various pixels. For example, for a pixel close to a metal artifact, a relatively large weighting coefficient may be chosen; for a pixel distant to a metal artifact, a relatively small weighting coefficient may be chosen.

It should be noted that the above description is merely provided for the purposes of illustration, and not intended to limit the scope of the present disclosure. For persons having ordinary skills in the art, multiple variations or modifications may be made under the teachings of the present disclosure. For example, in order to improve computational speed, one or more of the original image, the pre-corrected image, and the error image may be compressed. However, those variations and modifications do not depart from the scope of the present disclosure.

FIG. 13-A is a block diagram illustrating an architecture of a correction unit according to some embodiments of the present disclosure. The correction unit 330 may include a determination block 1301, a detection block 1302, an image creation block 1303, and a processing block 1304. In some embodiments, at least two of the blocks may be connected with each other via a wired connection (e.g., a metal cable, an optical cable, a hybrid cable, or the like, or any combination thereof) or a wireless connection (e.g., a Local Area Network (LAN), a Wide Area Network (WAN), a Bluetooth, a ZigBee, a Near Field Communication (NFC), or the like, or any combination thereof). In some embodiments, the blocks may be connected with each other through a medium. The medium may include a visible medium or an invisible medium (e.g., radio, optical, sonic, electromagnetic induction, etc.).

The determination block 1301 may determine a region of interest (ROI) in an original image. As used herein, the original image may refer to an image that is reconstructed based on the acquired signal. In some embodiments, the original image may be reconstructed by the reconstruction unit 320, or retrieved from the storage unit 340, an external resource (e.g., a hard disk, a floppy disk, a wireless terminal, or the like, or a combination thereof), or any storage disclosed anywhere in the present disclosure. In some embodiments, the ROI may be determined from a plurality of candidate regions of interest according to a criterion (more details may be found in FIG. 14 and the description thereof).

In some embodiments, the determination block 1301 may determine an image relating to the ROI from the original image. As used herein, an image relating to the ROI may refer to an image that is extracted from the original image. In some embodiments, the extraction may be performed by applying a mask to other region(s) besides the ROI in the original image, or cutting out the ROI from the original image. As used herein, a mask may refer to an object that may be used to cover a specific region in an image. In some embodiments, for a digital image, the mask may include a matrix (e.g., a two-dimensional array), a binary image in which value of a pixel may be 0 or 1, or the like, or any combination thereof.

The detection block 1302 may detect artifacts in the image relating to the ROI. In some embodiments, the artifact may include a metal artifact, a streak artifact, or the like, or a combination thereof. As used herein, the metal artifact may result from a metal object (e.g., a pin used in a hip, a surgical clip, a dental filling, or the like, or a combination thereof). The streak artifact may result from under-sampling, photon starvation, motion, beam hardening, Compton scatter, or the like, or a combination thereof, during the scanning. In some embodiments, during the detection of the artifacts, the image relating to the ROI may be processed (e.g., rotated, smoothed, filtered, or the like, or a combination thereof). In some embodiments, the detected artifacts may be further processed, for example, the artifacts may be marked in the image relating to the ROI or extracted from the image relating to the ROI.

The image creation block 1303 may generate an artifact image (e.g., an image including streak artifact of an original image, or referred to as a streak artifact image for brevity). In some embodiments, the artifact image may be generated by filtering the artifacts from the image relating to the ROI. In some embodiments, the artifact image may be further processed. For example, a compensation may be performed on the artifact image.

The processing block 1304 may process the original image, the image relating to the ROI, or the artifact image. In some embodiments, the original image may be corrected based on the image relating to the ROI and the artifact image.

It should be noted that the above description of the correction unit 330 is merely provided for the purposes of illustration, and not intended to limit the scope of the present disclosure. For persons having ordinary skills in the art, multiple variations or modifications may be made under the teachings of the present disclosure. For example, the determination block 1301 and the detection block 1302 may be integrated in an independent unit or block used to determine the ROI and detect the artifacts. As another example, the correction unit 330 may further include a storage block (not shown). The storage block may be used to store the acquired image and/or any intermediate data generated during any process performed by any block in the correction unit 330. As a further example, at least some of the blocks in the correction unit 330 may each include a storage block, or at least two of the blocks may share a common storage block. However, those variations and modifications do not depart from the scope of the present disclosure.

FIG. 13-B is a flowchart illustrating a process for correcting an image according to some embodiments of the present disclosure. In step 1310, an original image may be acquired. The original image may be reconstructed by the reconstruction unit 320, or retrieved from the storage unit 340, an external resource (e.g., a hard disk, a floppy disk, a wireless terminal, or the like, or a combination thereof), or any storage disclosed anywhere in the present disclosure.

In step 1312, an image relating to a region of interest (ROI) may be determined. The determination may be performed by the determination block 1301. As used herein, an image relating to an ROI may refer to an image that is extracted from the original image. The extraction may be performed by applying a mask to other region(s) besides the ROI in the original image, or cutting out the ROI from the original image. In some embodiments, the ROI may be determined from candidate regions of interest according to a criterion (more details may be found in FIG. 14 and the description thereof).

In step 1314, an artifact in the image relating to the ROI may be detected. The detection may be performed by the detection block 1302. In some embodiments, the artifact may be a streak artifact. In some embodiments, during the detection, an angle range may be determined, a processing angle may be selected from the angle range, and the image relating to the ROI may be rotated based on the processing angle. More details may be found in FIG. 15 and the description thereof.

In step 1316, an artifact image may be generated based on the detected artifact. In some embodiments, the artifact image may be generated by filtering the artifacts from the image relating to the ROI. In step 1318, the original image may be corrected based on the artifact image. Merely by way of example, the original image may be corrected by subtracting the artifact image from the original image (more details may be found in FIG. 16 and the description thereof).

It should be noted that the above description of the process for correcting an image is merely provided for the purposes of illustration, and not intended to limit the scope of the present disclosure. For persons having ordinary skills in the art, multiple variations or modifications may be made under the teachings of the present disclosure. For example, in some embodiments, a determination may be made as to whether the detected artifact may be a potential tissue. Furthermore, a compensation may be performed if the detected artifact is determined to be a potential tissue. However, those variations and modifications do not depart from the scope of the present disclosure.

Figure 14:
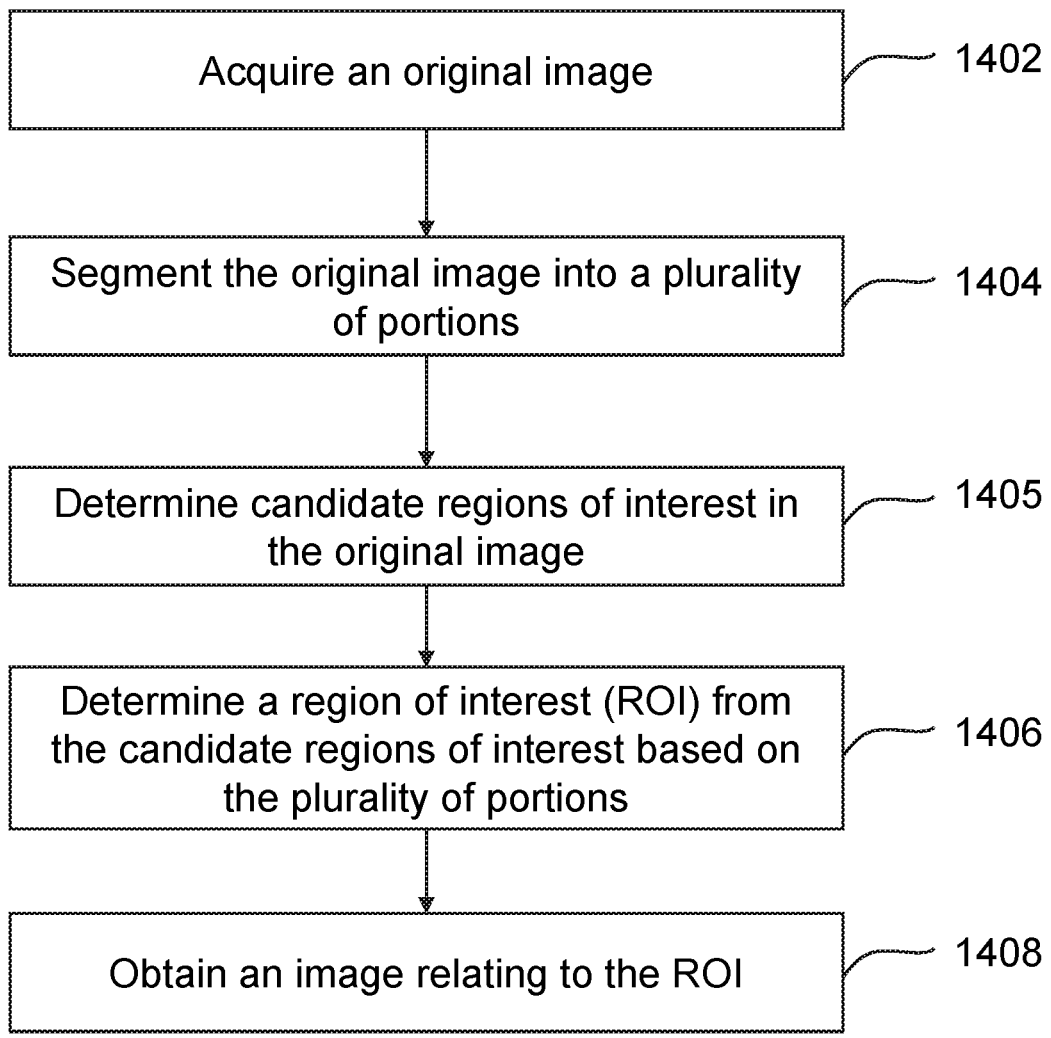
FIG. 14 is a flowchart illustrating a process for determining an image relating to a region of interest (ROI) according to some embodiments of the present disclosure.

FIG. 14 is a flowchart illustrating a process for determining an image relating to a region of interest (ROI) according to some embodiments of the present disclosure. The process for determining the image relating to the ROI may be performed by the determination block 1301. In step 1402, an original image may be acquired. In step 1404, the original image may be segmented into a plurality of portions. For example, for an original image regarding the head of a subject, the plurality of portions may include a portion including air, a portion including a tissue, or the like, or a combination thereof. In some embodiments, a segmentation method may be used. The segmentation method may include a thresholding method, a clustering method, a compression-based method, a histogram-based method, an edge detection method, or the like, or any combination thereof.

In step 1405, candidate regions of interest in the original image may be determined. As used herein, candidate regions of interest may refer to one or more regions in the original image from which the ROI may be selected. In some embodiments, the candidate regions of interest may be determined according to a first criterion. The first criterion may be set according to a default setting of the system 100, selected based on statistical information, or set by an operator (e.g., a doctor, an imaging technician, etc.). In some embodiments, different criteria may be set for different images (e.g., an image regarding the head of a subject, an image regarding a lung of a subject, or the like). Merely by way of example, for an image regarding the head of a subject, the candidate regions of interest may be determined based on the centroid positions of the candidate regions of interest, and/or the sizes of the candidate regions of interest, etc. (more details may be found in FIG. 16-A and the description thereof).

In step 1406, a region of interest (ROI) may be determined from the candidate regions of interest based on the plurality of portions (e.g., a portion including air, a portion including a tissue, or the like) segmented in step 1404. In some embodiments, the determination may be performed according to a second criterion. The second criterion may be set according to a default setting of the system, selected based on statistical information, or set by an operator (e.g., a doctor, an imaging technician, etc.). In some embodiments, a specific candidate region of interest that may satisfy a preset condition may be selected as the ROI. The preset condition may be a threshold regarding the percentage of a portion in the image. Different preset conditions may be set for different images (e.g., an image regarding the head of a subject, an image regarding a lung of the subject, or the like). For instance, for an image regarding the head of a subject, the preset condition may be a threshold regarding the percentage of the tissue in the head and/or a threshold regarding percentage of the air in the head. More details may be found in FIG. 16 and the description thereof.

In step 1408, an image relating to the ROI may be obtained. As mentioned in FIG. 13-B, the image relating to the ROI may be further processed. In some embodiments, an artifact may be detected in the determined image relating to the ROI and an artifact image may be further generated.

It should be noted that the above description of the process for determining an image relating to a region of interest (ROI) is merely provided for the purposes of illustration, and not intended to limit the scope of the present disclosure. For persons having ordinary skills in the art, multiple variations or modifications may be made under the teachings of the present disclosure. For example, in step 1402, an optimizing operation (e.g., denoising, etc.) may be performed on the original image. However, those variations and modifications do not depart from the scope of the present disclosure.

Figure 15:
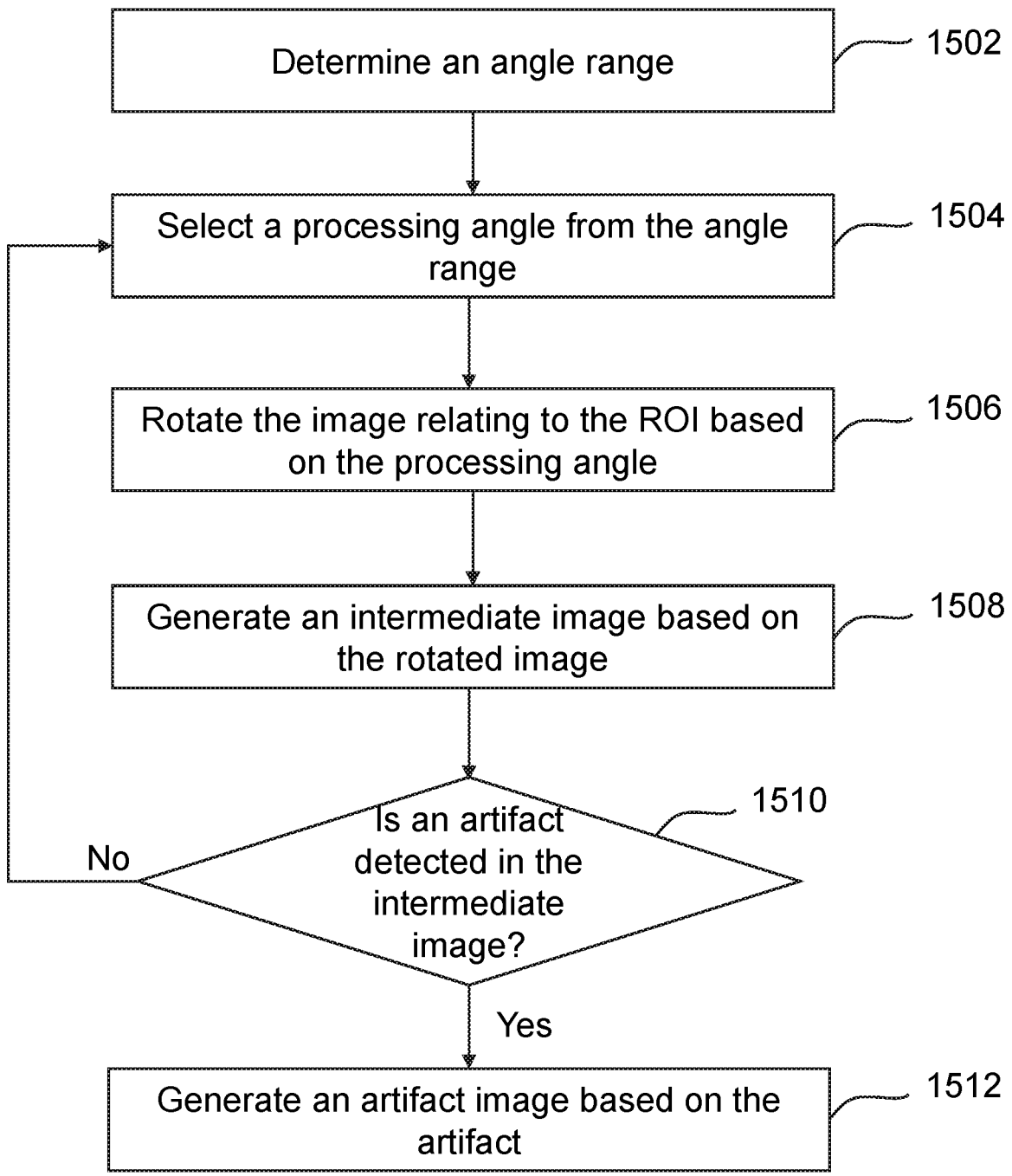
FIG. 15 is a flowchart illustrating a process for generating an artifact image according to some embodiments of the present disclosure.

FIG. 15 is a flowchart illustrating a process for generating an artifact image according to some embodiments of the present disclosure. The process for generating an artifact image may be performed by the image creation block 1303. In step 1502, an angle range may be determined. The angle range may be determined based on the size of the region in which the artifacts occur. In some embodiments, the angle range may include a combination of a plurality of single angles (e.g., 30 degrees, 40 degrees, 60 degrees, etc.), or a continuous angle range with an incremental step (e.g., between 30 degrees and 90 degrees with one-degree step). In some embodiments, the angle range may be determined based on a default setting of the system 100, or may be set by an operator (e.g., a doctor). In some embodiments, different angle ranges may be determined for different images. For example, for an image regarding the head of a subject, the angle range may be determined based on the central angle of the head.

In step 1504, a processing angle may be selected from the angle range. For example, for an angle range between 30 degrees and 90 degrees with a one-degree step, a processing angle of 30 degrees may be selected. In step 1506, the image relating to the ROI may be rotated based on the processing angle. The directions of the artifacts to be detected in an image may be various. During the detection, the artifacts in an image may be rotated to a same direction (e.g., the X-axis). In some embodiments, further processing (e.g., smoothing, filtering, or the like, or a combination thereof) may be performed by rotating the image including artifacts to the directions of the artifacts. For example, if the processing angle selected in step 1504 is 31 degrees, the image relating to the ROI may be rotated from 0 degree to −31 degrees, and the artifacts at 31 degrees may be rotated to the X-axis.

In step 1508, an intermediate image may be generated based on the rotated image. As used herein, an intermediate image may refer to an image that may be generated by processing the rotated image. In some embodiments, the intermediate image may be generated by subtracting a smoothed image from the rotated image relating to the ROI. As used herein, the smoothed image may be generated by smoothing the rotated image relating to the ROI. More details regarding the smoothed image may be found in FIG. 16-A and FIG. 16-B, and the description thereof.

In step 1510, a determination may be made as to whether an artifact is detected in the intermediate image. Merely by way of example, the intermediate image may be processed, and whether an artifact may be detected may be determined by analyzing gradient direction of the processed intermediate image. More details regarding the determination may be found in FIG. 16-B and the description thereof. If the answer is "yes," the process may proceed to step 1512 to generate an artifact image based on the artifact. The artifact image may be further used to correct the original image. If the answer is "no," the process may return to step 1504 to select a new processing angle from the angle range. A new intermediate image may be generated based on the new processing angle by repeating step 1504 through step 1508.

It should be noted that the above description of the process for generating an artifact image is merely provided for the purposes of illustration, and not intended to limit the scope of the present disclosure. For persons having ordinary skills in the art, multiple variations or modifications may be made under the teachings of the present disclosure. For example, step 1504 and step 1506 may be performed simultaneously or successively. However, those variations and modifications do not depart from the scope of the present disclosure.

FIG. 16-A through FIG. 16-C illustrate an exemplary process for generating a corrected image according to some embodiments of the present disclosure. In step 1602, an original image may be acquired. The original image may be a CT image acquired from a portion (e.g., the head) of a subject.

In step 1604, the original image may be segmented into a plurality of portions according to a segmentation method. In some embodiments, the segmentation method may include a thresholding method, a clustering method, a compression-based method, a histogram-based method, an edge detection method, or the like, or any combination thereof. In some embodiments, the segmentation may be performed according to a thresholding method. For example, one or more thresholds regarding CT value may be set. Merely by way of example, the original image may be acquired from the head of a subject. According to the thresholds regarding CT value, the original image may be segmented into a portion including air, a portion including a tissue, or the like, or a combination thereof.

In some embodiments, a set of pixels whose CT values are between 900 Hu and 1100 Hu may be deemed as the portion including a tissue; a set of pixels whose CT values are between 0 Hu and 500 Hu may be deemed as the portion including air.

In step 1606, candidate regions of interest in the original image may be determined. As used herein, candidate regions of interest may refer to one or more regions in the original image from which the ROI may be selected. In some embodiments, the candidate regions of interest may be determined according to a first criterion. The first criterion may be set according to a default setting of the system 100, selected based on statistical information, or set by an operator (e.g., a doctor, an imaging technician, etc.). In some embodiments, different criteria may be set for different images (e.g., an image regarding the head of a subject, an image regarding a lung of a subject, or the like). For example, for an image regarding the head of a subject, the candidate regions of interest may satisfy the following requirements: the centroids of the candidate regions of interest may be below the centroid of the head, and x directions of the centroids of the candidate regions of interest may not deviate from that of the centroid of the head too far (e.g., less than 20%); for a specific candidate region, the centroid is within the candidate region of interest; and the sizes of the candidate regions of interest may be not too small. For example, for an image regarding the head of a subject, the candidate region of interest may be 1% and 30% of the size of the head.

In step 1608, a region of interest (ROI) may be determined from the candidate regions of interest based on the plurality of portions. In some embodiments, the determination may be performed according to a second criterion. The second criterion may be set according to a default setting of the system, selected based on statistical information, or set by an operator (e.g., a doctor, an imaging technician, etc.). In some embodiments, a specific candidate region of interest that may satisfy a preset condition may be selected as the ROI. Different preset conditions may be set for different images (e.g., an image regarding the head of a subject, an image regarding a lung of a subject, or the like). In some embodiments, for an image regarding the head of a subject, the preset condition may be a threshold regarding percentage of the tissue in the head and/or a threshold regarding percentage of the air in the head. For example, for a specific candidate region of interest, the percentage of the issue in the head is less than 30%, and the percentage of the air in the head is larger than 1%, it may be determined as the ROI.

In step 1610, an image relating to the ROI may be obtained. As used herein, an image relating to the ROI may refer to an image that is extracted from the original image. In some embodiments, the extraction may be performed by applying a mask to other region(s) besides the ROI in the original image, or cutting out the ROI from the original image. As used herein, a mask may refer to an object that may be used to cover a specific region in an image. In some embodiments, for a digital image, the mask may include a matrix (e.g., a two-dimensional array), a binary image in which value of a pixel may be 0 or 1, or the like, or any combination thereof.

In step 1612, an angle range may be determined. The angle range may be determined based on the size of the region in which the artifacts occur. In some embodiments, the angle range may be determined based on an extension of a central angle. For example, for an image regarding the head of a subject, the central angle may be the central angle of the head. In some embodiments, the angle range may be determined according to Formula (16) below:

$$R=[D\text{Center}-D\text{Extend}, D\text{Center}+D\text{Extend}], iD=1, \qquad (16)$$

where R may represent the angle range, DCenter may represent the central angle, DExtend may represent the extension of the central angle, and iD may represent the incremental step.

In step 1614, a processing angle may be selected from the angle range. For example, for an angle range from 30 degrees to 90 degrees, a processing angle of 30 degrees may be selected. In step 1616, the image relating to the ROI may be rotated based on the processing angle. Based on the rotation of the image relating to the ROI, the direction(s) of the artifact(s) to be detected may be adjusted to the X-axis. After the image relating to the ROI is rotated, the process may follow at least some steps starting from node A 1618 as illustrated in FIG. 16-B.

FIG. 16-B illustrates an exemplary process for generating a streak artifact image according to some embodiments of the present disclosure. In step 1620, the rotated image relating to the ROI may be smoothed. The smoothing algorithm may include a cubical smoothing algorithm with five-point approximation, a linear smoothing method, an interpolation method, or the like, or any combination thereof.

In step 1626, a smoothed image may be generated based on the rotated image relating to the ROI. In step 1628, a subtracted image may be generated. As used herein, a subtracted image may refer to an image generated by subtracting the smoothed image from the rotated image relating to the ROI.

In step 1630, a determination may be made as to whether a streak artifact is detected in the subtracted image. If the answer is "no," the process may follow at least some steps staring from node C 1631 as illustrated in FIG. 16-C. If the answer is "yes," the process may proceed to step 1632 to determine a region including the streak artifact.

In some embodiments, in step 1630, during the detection of the streak artifact, the subtracted image may be processed. A gradient direction of the subtracted image may be calculated according to Formula (17) below:

$$Gdir = \arctan\left(\frac{\frac{\partial Irs}{\partial y}}{\frac{\partial Irs}{\partial x}}\right), \qquad (17)$$

where Gdir may represent the gradient direction of the subtracted image, and Irs may represent the subtracted image. In some embodiments, the subtracted image may be dispersed by a difference operator, e.g., a Sobel operator. A plurality of rows (e.g., M rows) of the subtracted image may be determined, and the row may include a plurality of pixels. The numbers of pixels in the plurality of rows may be different. For example, for row m, there may be a pixels, for row n, there may be b pixels. Furthermore, the sum of sine values of the gradient directions of the row in the subtracted image may be calculated according to Formula (18) below:

$$\text{Sum}(m)=\Sigma_1^N \sin(Gdir(m)), \qquad (18)$$

where m may represent a row of the subtracted image, Sum(m) may represent the sum of sine values of the gradient directions of the pixels in the row m, sin(Gdir(m)) may represent the sine value of the gradient direction of row m in the subtracted image, and N may represent total number of pixels in the row m.

In some embodiments, a statistical curve regarding the sum of sine values of the gradient directions may be obtained. For the statistical curve, the x-axis may represent the row (e.g., row m, row n, or the like) of the subtracted image, the y-axis may represent the sum of sine values of the gradient directions of the row. Peaks and valleys may be extracted on the statistical curve. A peak or a valley may correspond to a row. A streak artifact may be detected in the subtracted image based on the peaks and valleys. For example, for an image regarding the head of a subject, if the peaks and the valleys satisfy some preset conditions, it may indicate that the positions in the subtracted image corresponding to the peaks and valleys may be positions corresponding to streak artifacts. In some embodiments, the preset conditions may be provided by at least two thresholds, for example, T1 and T2. T1 may stand for a threshold with respect to the value of a peak or the value of a valley (i.e., T1 stands for a threshold with respect to the sum of sine values of the gradient directions of the row). T2 may stand for a threshold with respect to the distance between one pair of a valley and a peak. In some embodiments, the threshold(s) T1 may be different for different rows in the subtracted image. For example, the values of T1 may vary as a threshold curve. For the threshold curve, the x-axis may represent the row in the subtracted image, the y-axis may represent the value of the peak or the value of the valley (also referred to as "amplitude"). In some embodiments, T1 and T2 may be set based on a default setting of the system 100, empirical values, or by an operator (e.g., a doctor). In some embodiments, T1 and T2 may be set according to the resolution of the subtracted image. Merely by way of example, for a row in an image regarding the head of a subject with a 512×512 matrix and 230 FOV (field of view), in this situation, the row includes 180 pixels, T1 may be set as 50. As used herein, the threshold "50" may be referred to as a "basic threshold". For a row including N pixels, the value of T1 may be (N×50)/180. T2 may be set as a distance value between a pair of peak and valley which corresponds to 3-8 pixels (e.g., 4 pixels) between the two corresponding rows in the subtracted image. The positions of the peak and the valley that satisfy the preset conditions may be recorded as a start position and an end position of the streak artifact, respectively.

In step 1632, a region including the streak artifact may be determined based on the detected streak artifact. In some embodiments, the region may be determined based on an extension of the start position and the end position of the streak artifact. For example, in some embodiments, several pixels (e.g., 2-3 pixels) may be extended along the start position and the end position of the streak artifact. The region including the streak artifact may be determined according to Formula (19) and Formula (20) below:

$$Rstart = Rstart0 - Rn, \quad (19)$$

$$Rend = Rend0 + Rn, \quad (20)$$

where Rstart may represent the start position of the region including the streak artifact, Rend may represent the end position of the region including the streak artifact, Rstart0 may represent the start position of the detected streak artifact, Rend0 may represent the end position of the detected streak artifact, and Rn may represent the extension pixels along Rstart0 and Rend0. It should be noted that the extension should not exceed the edge of the subtracted image.

In step 1634, the region including the streak artifact may be filtered. In some embodiments, the filtering may be performed by a comb filter. In step 1636, a streak artifact image may be generated based on the filtering in step 1634. As used herein, a streak artifact image may refer to an image only including the streak artifact(s). After the streak artifact image is generated, the process may follow at least some steps starting from node D 1638 as illustrated in FIG. 16-C.

FIG. 16-C illustrates an exemplary process for generating a corrected image according to some embodiments of the present disclosure. In step 1640, a compensation may be performed on the streak artifact image. In some embodiments, a "fake artifact" may appear in the streak artifact image. As used herein, a "fake artifact" may refer to a potential tissue (e.g., a blood vessel, a tissue of a head, or the like, etc.) that may be identified as a streak artifact. In order to remove or reduce the "fake artifact" in the streak artifact image, a compensation may be performed on the streak artifact image. Merely by way of example, there may be a plurality of streaks in the streak artifact image. CT values of the streaks may be computed and analyzed, and a streak peak and a streak valley may be determined.

In some embodiments, whether a compensation may be performed may be determined. For example, if a streak valley is determined and the position of the streak valley is closer to the skull base than that of the streak peak, it may indicate that there may be a potential tissue in the streak artifact image and a compensation may be needed. In some embodiments, the compensation may be performed according to Formula (21) below:

$$IreC(iStreakPeak{:}end,{:}) = Ire(iStreakPeak{:}end,{:})*Weighting, \quad (21)$$

where IreC(iStreakPeak:end,:) may represent the compensated part of the streak artifact image, Weighting may represent weighting coefficient of the compensation, iStreakPeak may represent the position of the streak peak, end may represent the end position of the streaks in the streak artifact image, and Ire(iStreakPeak:end,:) may represent the part of the streak artifact image to be compensated.

In step 1642, the compensated streak artifact image may be re-rotated based on the processing angle in connection with the rotation illustrated in step 1616. In step 1644, a preliminarily corrected image may be generated based on the image relating to the ROI and the re-rotated streak artifact image. According to some embodiments of the present disclosure, the preliminarily corrected image may be generated by subtracting the re-rotated streak artifact image from the image relating to the ROI.

In step 1646, the system may determine whether all the processing angles within the angle range are selected. If the answer is "yes," the process may proceed to step 1648 to generate a corrected image. If the answer is "no," the process may proceed to node B 1624 to return back to step 1614, i.e., a new processing angle may be selected from the angle range and a next correction process may be performed by repeating step 1614 through step 1644. In some embodiments, the next correction process may be performed based on the preliminarily corrected image generated in step 1644. For example, the image relating to the ROI in the next correction process may be updated by the preliminary corrected image generated in step 1644.

In step 1648, a corrected image may be generated. As used herein, a corrected image may refer to an image generated by subtracting the streak artifact image from the original image. As illustrated in step 1644, a preliminarily corrected image may be generated. In some embodiments, the corrected image may be generated by supplementing other region(s) besides the ROI to the preliminarily corrected image. For example, the mask that may be used to cover other region(s) besides the ROI may be removed. As another example, other region(s) besides the ROI that may be cut from the original image may be added. In some embodiments, a streak artifact image including all the streak artifacts may be generated based on the preliminarily corrected image. The corrected image may be generated by subtracting the streak artifact image including all the streak artifacts from the original image.

Furthermore, in some embodiments, before generating the corrected image, the streak artifact image including all the streak artifacts may be smoothed. In some embodiments, the smoothing may be performed in frequency domain or in time domain. The smoothing algorithm may include a Gauss filtering algorithm, a Median filtering algorithm, or the like, or any combination thereof. In some embodiments, the smoothing may be performed based on the resolution of the streak artifact image. Merely by way of example, a streak artifact image with high resolution (e.g., pixel spacing <0.7) may be smoothed.

It should be noted that the above description of the process for generating a corrected image is merely provided for the purposes of illustration, and not intended to limit the scope of the present disclosure. For persons having ordinary skills in the art, multiple variations or modifications may be made under the teachings of the present disclosure. For example, in some embodiments, before the segmentation of the original image in step 1604, the original image may be compressed according to a compression ratio (e.g., 8:1). The determined ROI determined may be marked in the original image according to the compression ratio. As another example, in some embodiments, the result of the current correction process may be provided as a feedback for the next correction process. In general, for a scanning sequence, a plurality of images may be reconstructed. The plurality of images may be corrected in order. If no ROI is determined in the current correction process, it may indicate that there may be no ROI(s) in the image(s) that may be processed later. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "module," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for image correction implemented on a computing device including at least one processor and at least one storage, the method comprising:
   receiving an original image including a metal artifact;
   pre-correcting the original image by removing or correcting the metal artifact in the original image;
   determining an error image based on the original image and a pre-corrected image;
   for each of a plurality of target pixels in the error image, determining a weighting coefficient corresponding to the target pixel by:
      determining a first neighborhood matrix of a first pixel in the pre-corrected image based on a second neighborhood matrix of a second pixel in the original image and a target neighborhood matrix of the target pixel in the error image, the first pixel corresponding to the second pixel in the original image and the target pixel in the error image, wherein a size of the second neighborhood matrix or a size of the target neighborhood matrix is determined based on a feature of the error image:
      determining information entropy of the first pixel in the pre-corrected image based on the first neighborhood matrix; and
      determining the weighting coefficient corresponding to the target pixel in the error image based on the information entropy of the first pixel in the pre-corrected image;
   weighting the original image and the error image based on a plurality of weighting coefficients corresponding to the plurality of target pixels; and
   generating a corrected image based on the weighting.

2. The method of claim 1, wherein the information entropy of the first pixel in the pre-corrected image is a variable relating to the weighting coefficient, and the weighting coefficient is determined such that the information entropy of the first pixel in the pre-corrected image is minimum.

3. The method of claim 1, wherein the feature of the error image includes an amount of metal artifact in the error image.

4. The method of claim 1, wherein the size of the second neighborhood matrix or the size of the target neighborhood matrix is determined based on a regularity degree of the metal artifact, the regularity degree of the metal artifact being associated with an actual projection area of the metal artifact and an ideal projection area of the metal artifact.

5. The method of claim 1, wherein the size of the second neighborhood matrix or the size of the target neighborhood matrix is between 9 and 31 pixels.

6. The method of claim 1, further comprising:
   performing a compensation on the corrected image.

7. The method of claim 6, the performing the compensation on the corrected image comprising:
   segmenting a high frequency part of the original image;
   segmenting a low frequency part of the corrected image; and
   performing the compensation on the corrected image by fusing the high frequency part of the original image and the low frequency of the corrected image.

8. A system, comprising:
   at least one storage device including a set of instructions for image correction;
   at least one processor in communication with the at least one storage device, wherein when executing the set of instructions, the at least one processor is configured to cause the system to:
   receive an original image including a metal artifact;
   pre-correct the original image by removing or correcting the metal artifact in the original image;
   determine an error image based on the original image and a pre-corrected image;
   for each of a plurality of target pixels in the error image, determine a weighting coefficient corresponding to the target pixel by:
      determining a first neighborhood matrix of a first pixel in the pre-corrected image based on a second neighborhood matrix of a second pixel in the original image and a target neighborhood matrix of the target pixel in the error image, the first pixel corresponding to the second pixel in the original image and the target pixel in the error image, wherein a size of the second neighborhood matrix or a size of the target neighborhood matrix is determined based on a feature of the error image;
      determining information entropy of the first pixel in the pre-corrected image based on the first neighborhood matrix; and
      determining the weighting coefficient corresponding to the target pixel in the error image based on the information entropy of the first pixel in the pre-corrected image;
   weight the original image and the error image based on a plurality of weighting coefficients corresponding to the plurality of target pixels; and
   generate a corrected image based on the weighting.

9. The system of claim 8, wherein the information entropy of the first pixel in the pre-corrected image is a variable relating to the weighting coefficient, and the weighting coefficient is determined such that the information entropy of the first pixel in the pre-corrected image is minimum.

10. The system of claim 8, wherein the feature of the error image includes an amount of metal artifact in the error image.

11. The system of claim 8, wherein the size of the second neighborhood matrix or the size of the target neighborhood matrix is determined based on a regularity degree of the metal artifact, the regularity degree of the metal artifact being associated with an actual projection area of the metal artifact and an ideal projection area of the metal artifact.

12. The system of claim 8, wherein the size of the second neighborhood matrix or the size of the target neighborhood matrix is between 9 and 31 pixels.

13. The system of claim 8, wherein the at least one processor is configured to cause the system further to:
   perform a compensation on the corrected image.

14. The system of claim 13, wherein to perform the compensation on the corrected image, the at least one processor is configured to cause the system to:
   segment a high frequency part of the original image;
   segment a low frequency part of the corrected image; and
   perform the compensation on the corrected image by fusing the high frequency part of the original image and the low frequency of the corrected image.

15. The method of claim 1, the pre-correcting the original image by removing or correcting the metal artifact in the original image comprising:

determining a metal image including the metal artifact based on the original image;
generating projection data of the metal image;
performing an interpolation based on the projection data of the metal image and projection data of the original image; and
determining the pre-corrected image based on the interpolation.

16. The system of claim 8, wherein to pre-correct the original image by removing or correcting the metal artifact in the original image, the at least one processor is configured to cause the system to:
determine a metal image including the metal artifact based on the original image;
generate projection data of the metal image;
perform an interpolation based on the projection data of the metal image and the projection data of the original image; and
determine the pre-corrected image based on the interpolation.

17. A non-transitory computer readable medium comprising executable instructions that, when executed by at least one processor, cause the at least one processor to effectuate a method for image correction implemented on a computing device, the method comprising:
receiving an original image including a metal artifact;
pre-correcting the original image by removing or correcting the metal artifact in the original image;
determining an error image based on the original image and a pre-corrected image;
for each of a plurality of target pixels in the error image, determining a weighting coefficient corresponding to the target pixel by:
determining a first neighborhood matrix of a first pixel in the pre-corrected image based on a second neighborhood matrix of a second pixel in the original image and a target neighborhood matrix of the target pixel in the error image, the first pixel corresponding to the second pixel in the original image and the target pixel in the error image, wherein a size of the second neighborhood matrix or a size of the target neighborhood matrix is determined based on a feature of the error image;
determining information entropy of the first pixel in the pre-corrected image based on the first neighborhood matrix; and
determining the weighting coefficient corresponding to the target pixel in the error image based on the information entropy of the first pixel in the pre-corrected image;
weighting the original image and the error image based on a plurality of weighting coefficients corresponding to the plurality of target pixels; and
generating a corrected image based on the weighting.

* * * * *